Aug. 13, 1940.   M. EWALD   2,210,909
FRUIT TREATING APPARATUS
Original Filed Sept. 27, 1932   7 Sheets-Sheet 5

Inventor:
Mark Ewald

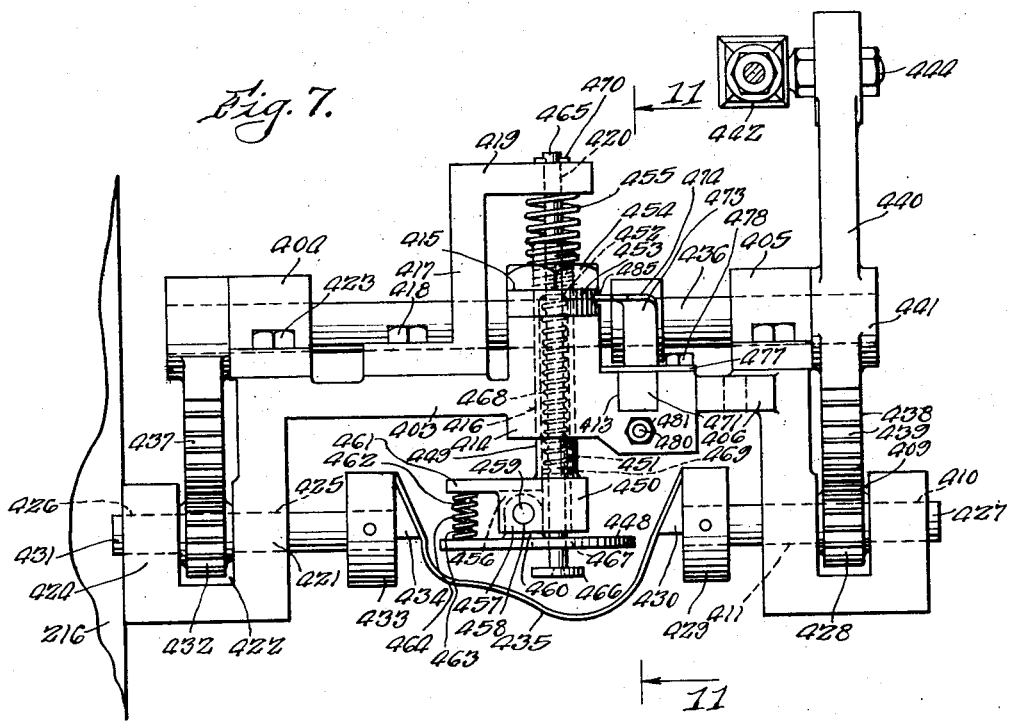
Fig. 7.
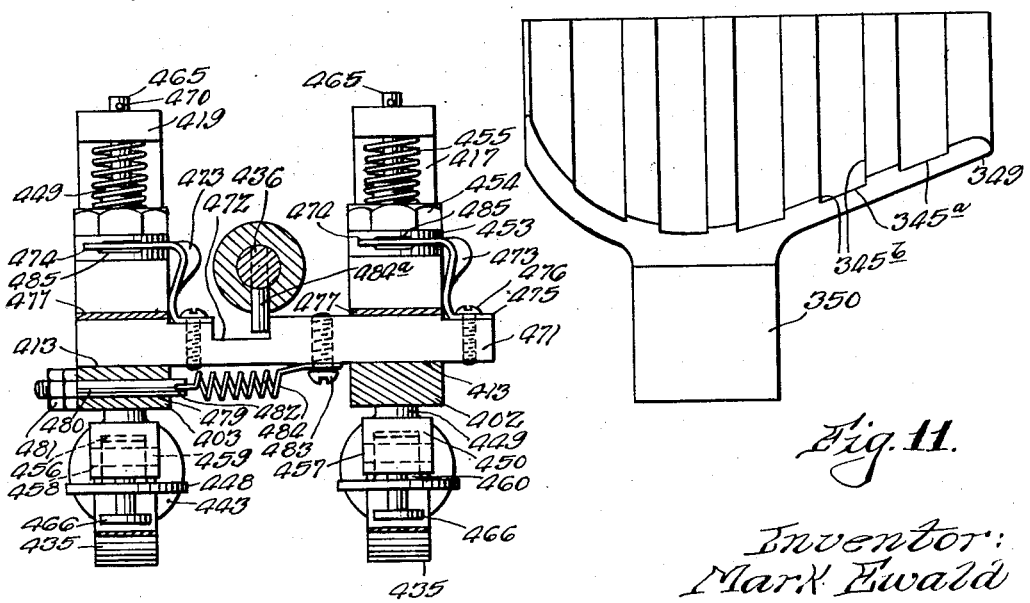
Fig. 8.
Fig. 11.
Inventor:
Mark Ewald

Aug. 13, 1940.  M. EWALD  2,210,909
FRUIT TREATING APPARATUS
Original Filed Sept. 27, 1932    7 Sheets-Sheet 7

Inventor:
Mark Ewald

Patented Aug. 13, 1940

2,210,909

UNITED STATES PATENT OFFICE 2,210,909

FRUIT TREATING APPARATUS

Mark Ewald, Olympia, Wash., assignor to Special Equipment Company, Portland, Oreg., a corporation of Oregon Application September 27, 1932, Serial No. 635,061
Renewed July 29, 1939

38 Claims. (Cl. 146—43)

The present invention relates to a machine for treating fruit and particularly to a machine constructed to hold the fruit while cutting the same.

Among the objects of my invention are to provide a fruit treating apparatus having provision for effectively holding fruit between a plurality of relatively movable members while performing cutting operations upon the fruit, and wherein means is provided for permitting a relative yielding movement between the holding means during the cutting operation; to provide a fruit treating apparatus having a plurality of relatively movable means for holding a fruit while a cutting operation is performed upon the fruit and including means for permitting a relative yielding movement between the holding members during a portion of the cutting operation and for preventing the relative yielding movement between the members during another portion of the cutting operation; to provide a fruit treating apparatus with relatively movable members for holding a fruit during the paring of the fruit, together with means permitting a relative yielding movement between the members during a portion of the paring operation while preventing the yielding movement during another portion of the paring operation, wherein to provide an effective and complete peeling of the fruit; to provide an apparatus specifically and particularly constructed to peel half fruit, and particularly half pears, wherein relatively movable members are provided for yieldingly holding the half fruit or half pear while a peeling operation is performed thereon, and wherein means is provided for preventing the relative yielding movement between the holding members during the final portion of the peeling operation, whereby to prevent the edge portions of the fruit being injured during the peeling operation; to provide yieldable holding means for fruit cutting and particularly fruit peeling operations, and specifically for cutting half fruits, wherein the fruit is yieldingly held between opposed relatively movable members in order to compensate for variations in size of fruit, and particularly during a portion of a cutting or peeling operation, and wherein the holding members are positively held or locked against relative movement during another portion of the cutting and/or peeling operation so as to provide an accurate and clean cutting effect; to provide a holding and cutting mechanism for fruit which operates to prevent the adhesion of the somewhat sticky fruit to the holding means, whereby to permit the operation or discharge of the somewhat gummy or sugary fruit from the holding means; to provide a fruit cutting and particularly a fruit peeling device embodied in an automatic machine which will effectively cut fruits of variant firmness, such for instance as ripe or partially ripened peaches, pears and the like, and specifically soft or firm pears; and to provide an automatic machine embodying the foregoing features.

The above generic object and a vast number of corollary objects later to be made apparent, resides in the novel arrangement, unique construction, and improved combination of the parts comprising the invention as set forth in the following description, in which like reference characters designate similar parts.

While the present invention is exemplified in connection with a device for treating pears, it is to be understood that certain of the generic aspects of the invention are equally applicable to other types of fruit.

In the accompanying drawings made a part of this specification:

Figure 7 is a fragmentary view of the device showing a side elevation of the peeling mechanism;

Figure 8 is a vertical cross-section of the peeling mechanism, taken at the line 11—11 of Figure 7, and with certain parts omitted to more saliently present the parts shown;

Figure 11 is a perspective view of the inner wall of a fruit cup element taken in elevation.

Like reference characters are used throughout the following description and in the drawings to indicate similar parts.

The frame

Figure 1:
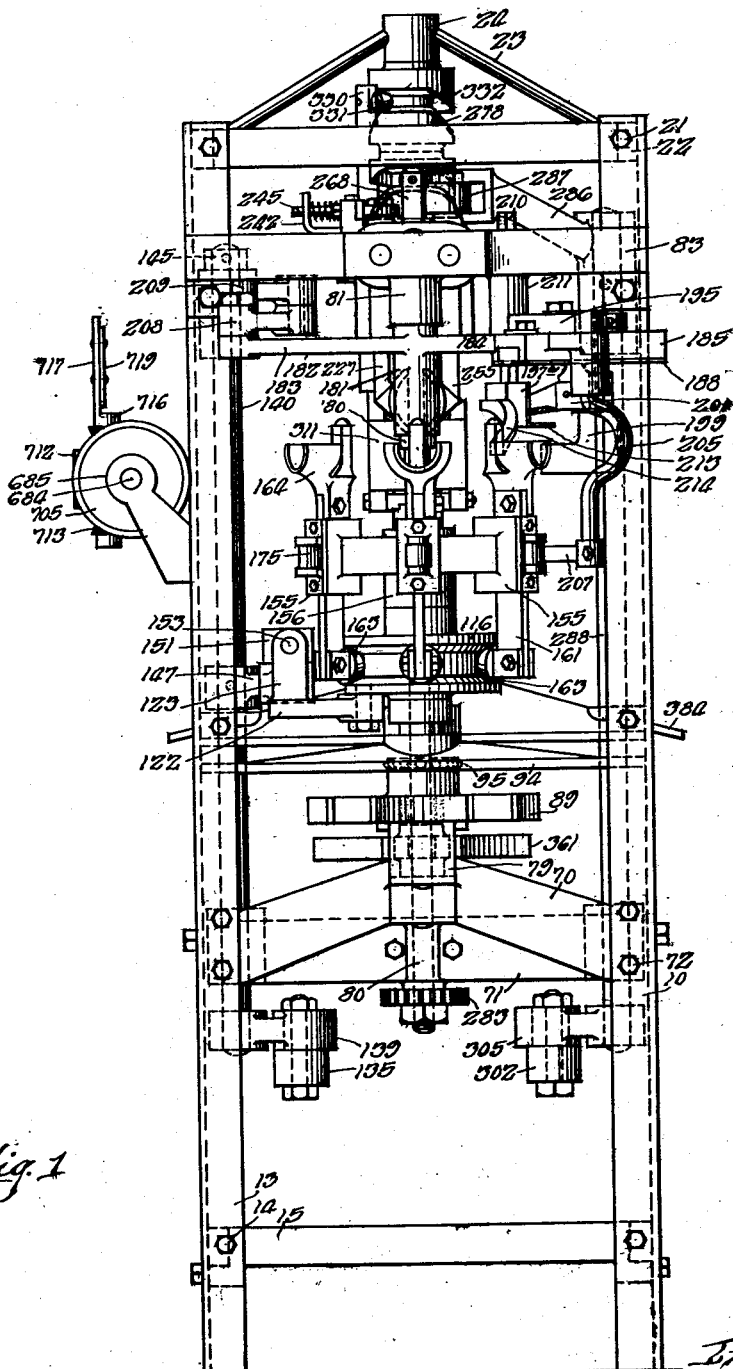
Figure 1 is a side elevation of a device embodying the invention taken from the front, with certain parts not shown to clarify assembly of other parts.

The frame providing a support for the device, selected from a number of possible embodiments, comprises the several upright angle members 10, 11, 12 and 13, which are symmetrically and equally spaced. Near the bottom of said angle members and fabricated thereto by studs 14 are four cross bars 15 describing a square, the four upright members being rigidly positioned at the four corners of the transverse figure.

Halfway between the standards 11 and 12 and secured to cross bar 15 by means of studs 16 is a vertical bracket 17 presenting the face of a broadened end 18 contiguous to said cross bar. The upper end of the member 17 provides a flared section 19 presenting a flat face inward of the frame. Lateral displacement of the upper end of bracket 17 is prevented by a cross tie to the frame upright 12 in the form of a strap 20.

Fitting flatly next to the inwardly presented face of section 19 is the butt 54 of a horizontal bearing member 55, to be there stationed by means of cap screws 56. Within the member 55, and in alinement with a tapped boring 57 therebetween, are two bearings 58 and 59 all having vertical axes, the latter of which, 59, being centrally located relative to the frame. An intricate transverse end plate 60 may form the forward end of the cross member 55, and a rib 61 may be provided coextensive its greater dimension. Conjoining the four upright standards at their top at each of its four corners by means of studs 21 is a square box casting 22. Rods 23 extend or converge inwardly and upwardly from each corner of the casting 22 to culminate in a central crown bearing 24. In this manner a strong and rigid frame is assembled for the device, which frame is further strengthened by the cross attachment of various parts of the mechanism as will be made apparent later.

The driving mechanism

The machine may be coupled in any manner to a prime mover capable of transmitting a steady tortional force. The particular means for receiving power in the illustrated form employs a belt pulley 25 rotatively mounted upon a main drive shaft 26. Said shaft is in turn rotatively journaled in bearing blocks 27 and 28 secured to the outside of upright members 11 and 12 respectively.

An internal cone clutch member 29 projects to the right from the hub of pulley 25. Keyed to the shaft 26 in a manner permitting of longitudinal movement thereon is a second element 30 of the cone clutch assembly containing a circular recess 31 with an inclined wall 32. The complemental member 30 provides at its right side a section of smaller diameter and having an annular boss 33 circumscribing its periphery. A hand wheel 34 may be turned upon the end of shaft 26 as a stop to prevent the recessed member 30 from sliding off the end of the shaft.

To the left of the pulley 25, between said pulley and the bearing block 27, is a small pinion 43 keyed to the shaft 26.

An implement for shifting the position of the clutch member 30 is provided in the form of a compound lever 35. Said lever has a bifurcated end 36 containing slots 37, which clear the annular boss 33 that it may rotate therein. Between the end 36 and the opposite end, or handle 38 of the lever 35, is a circuitous articulation reaching to a position in approximate alinement with the uprights 10 and 11 and culminating in a vertical bearing 39.

Suspended intermediate uprights 10 and 11 is a side bar 40 to which is attached a centrally drilled and tapped fitting 41. The bearing 39 of levers 35 is seated over the drilled and tapped member 41 in a manner to operate about the shank of a bolt 42 threaded into said member.

On the upper edge of the cross member 15 between standards 10 and 11 is a boss 44 to which is anchored, by means of a stud 45, the foot 46 of bearing standard 47. The horizontal leg 48 of standard 47 presents a bearing 49, and extends to have its end suitably fastened to a side of upright 11.

Opposed to standard 47, and similarly secured to the cross brace 15 between vertical members 12 and 13 and to the member 12, is a congruent standard 50 carrying a bearing 51 complemental to and in alinement with bearing 49. Rotatively mounted within the bearings 49 and 51 is a cam shaft 52. The right end of the shaft 52 extends beyond the standard 47 to receive in a manner to rotate therewith a gear wheel 53 of a greater diameter than the pinion 43 and meshing therewith.

The loading mechanism

Fruit, before being split and peeled, is fed by hand into the loading mechanism at the front of the machine. A base frame 70 for the loading mechanism is substantially triangular in shape and presents between the vertical frame standards 10 and 13 a horizontal piece 71 to be there secured by machine studs 72. The position thus assumed by the piece 71 strategically lends to the strength of the machine frame, and provides at its mid-section a flat face 73, see Figure 10, to coincide with the end plate 60 to support the front end of the horizontal bearing member 55 with the aid of cap screws 74. Vertical bearings 75 and 76 are placed within the two ends of piece 71 to be embraced well within the corners formed by the angles 10 and 13 respectively.

Rising symmetrically upwardly and forwardly from the extremities of bar 71 are integral truss members 75a uniting in a circular junction 76a providing a vertical bearing 77. Extending directly forward and upwardly within the plane described by the trusses 75a and from the junction 76a is an arm 78 at the end of which is a fourth vertical bearing 79 which is aggregated in the frame 70. A short reinforcing member 80 in retrogression of arm 78 conjoins the bearing box 76a and the mid-section of horizontal piece 71.

Directly above bearing 79 is a boss 81 depending downwardly from the side 82 subtending the converging ends of member 83 comprising a trapezoidal structure 84. The structure 84 projects forwardly from the machine from adjacent the top of uprights 10 and 13. The boss 81 has a central aperture 85 which coreceives with the bearing 79, and in a non-rotative manner, a vertical shaft 86.

Figure 10:
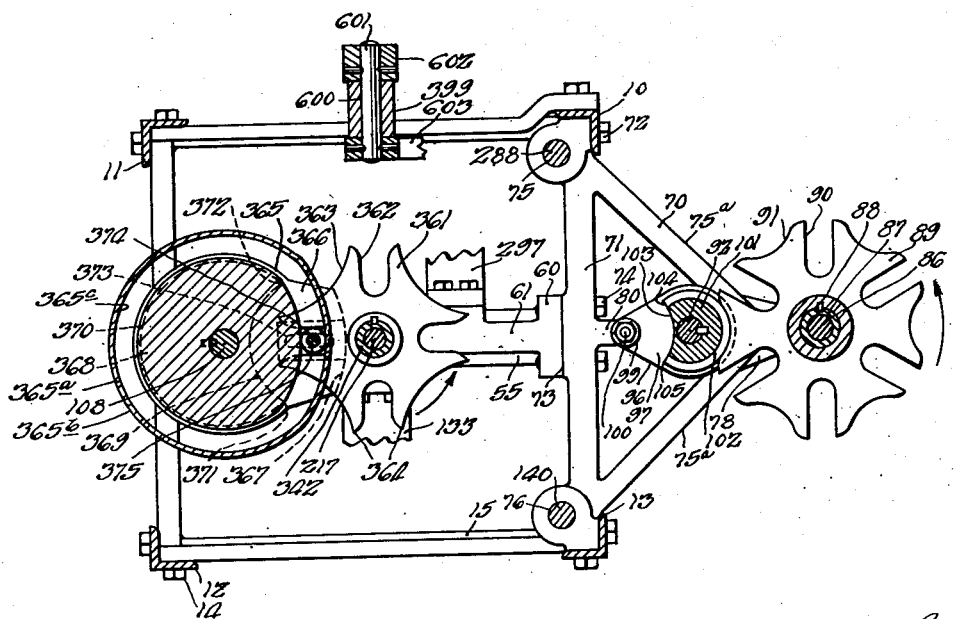
Figure 10 is a transverse section taken through the machine as indicated by the line 19—19 of Figure 4, and shows particularly a Geneva cam arrangement.

Resting upon the top face of the bearing member 79 is a sleeve 87 which is free to rotate about the stationary shaft 86. Secured to the sleeve 87 to rotate therewith is the hub 8 of a Geneva cam 89. The cam 89 as shown in Figure 10 has a body of flat plate material having spaced alternately about its circumference six deep radial grooves 90, and an equal number of arcuate cut-away sections 91.

The lower end of a spindle 92 is journaled in the bearing 77, the upper end of the journaled member being rotatively confined within a suitable bearing 93 provided in a hood 94. Keyed to the spindle contiguously beneath the hood is a small sprocket wheel 95 for driving said spindle. Also, feathered to the spindle 92 and at its lower end is a cam member 96 conjunctive to the Geneva cam 89. The member 96 comprises an eccentric plate 97 measurably elevated to a horizontal plane just below that described of the Geneva cam 89 by a downwardly projecting hub 98 riding on the upper edge of bearing block 76a.

A roller bearing 99 is journaled in an upright position adjacent the point of eccentricity of of the plate 97 by means of a pin 100. Opposed to the roller 100 and upon the upper face of the eccentric plate 97 is an intricate super-structure 101 having an arcuate edge 102 generated about the longitudinal axis of spindle 92, and of equal radius to that describing the arcuate sections 91 of the Geneva cam 89. The edge 102 is interrupted by a concavation 103, thereby forming shoulders 104 and 105.

A beveled pinion 106 is securely fastened to the cam shaft 52 by a set screw 107. Similarly mounted on the lower end of a shaft 108, stationed vertically in the bearing 58, is a beveled gear 109, the latter meshing with the pinion 106. An offset hub 110 extending upwardly from the gear 109 bears an annular toothed shoulder 111. The extreme upper end of the shaft 108 carries, to rotate therewith, a sprocket wheel 112 which is of equal elevation to the sprocket 95. The two sprockets 95 and 112 are operatively connected by a roller chain 113.

Reference is again had to the front of the machine. The hood 94 provides a hole 114 circumscribing the sleeve 87. Secured to the sleeve 87 just above the hood 94 is a collar 115 fastened fixedly thereto, and in a manner prohibitive of axial displacement. The collar 115 serves as a base rest for a circular cam 116 bearing an irregular race intermediate upper and lower flanges 117 and 118, respectively. An upwardly inclined camming surface 119 followed by a downwardly inclined surface 120 (not shown) is provided in the cam 116. The culmination 121 dividing the surfaces 119 and 120 is shown at the back side of the cam, Figure 2.

Depending from the left and lower side of the flange 118 is a horizontal arm member 122 forming at its extended end an upturned lug 123. The arm 122 is stationed firmly upon the flange 118 by means of a bolt 124 so that a movement of the lug bearing end of said arm will result in a rotary motion being transmitted to the cam 116 rather than a pivotal movement of the arm about its anchorage 124.

Figure 4:
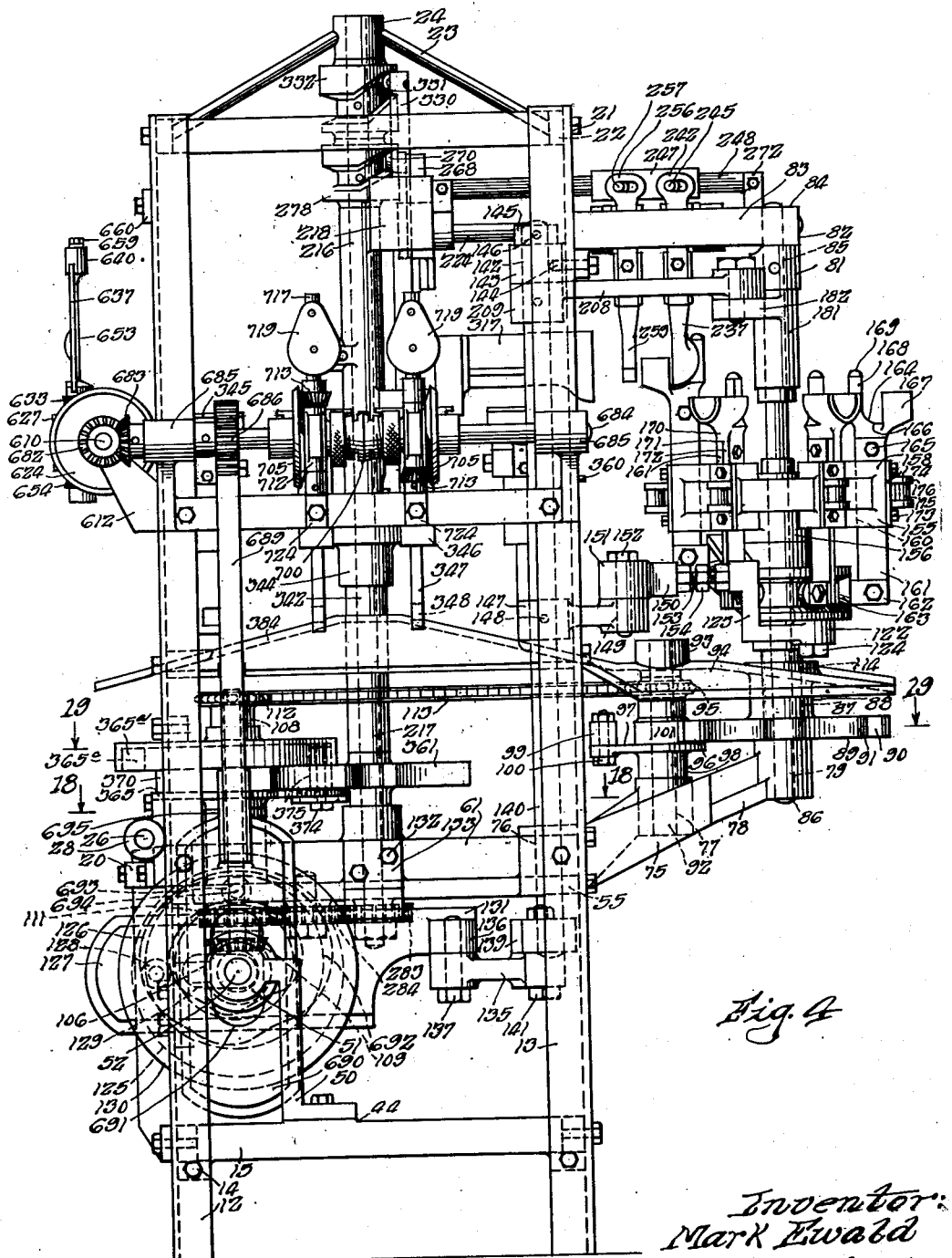
Figure 4 is an elevation of the machine as taken from the left side with certain background parts not shown.

The operating means for the arm 122 and the cam 116 comprises the now to be described linkage inter-connecting said arm and a cam 125 keyed to the cam shaft 52. In the left face of a cam 125 is an eccentric groove 126 circumscribing the bearing receiving the shaft 52 (see Figure 4). Presenting a broad flat face to the grooved side of cam 125 is a cam follower 127 having a roller bearing 128 mounted on said flat face to project into the groove or race 126.

A longitudinal slot 129 in the cam follower 127 provides a means coacting with the shaft 52 prohibiting vertical displacement of the cam follower but allowing a reciprocal movement as imparted thereto by the action of the side walls of the groove 126 upon the roller bearing 128. Contiguous to the left side of the cam follower 127 is a second cam 130 which estops lateral movement of the follower so that the roller bearing 128 cannot escape from the race therefor in the cam 125.

Along the upper edge of the follower 127 is a narrow rib or track 131. Depending to the left, in a horizontal manner, from the side wall of bearing 59 and secured by standard fastening means 132 is a guide bracket 133. The lower side of the bracket 133 is scored by a deep groove 134, which receives the track 131 in a slidable manner to insure a movement of the cam follower 127 in its forward and backward progressions having deviation neither to the right nor to the left.

One end of horizontal link 135 hingedly enjoins an intricate lug 136 at the forward end of the cam follower 127 by means of a journal member 137 anchored in said lug. The opposite end of link 135 operatively engages a slot 138 at the extended end of an arm 139 keyed to a vertical shaft 140, and by means of a pin 141. Journals for the shaft 140 are provided in the bearings 76 and 142, the latter being in a block 143 secured within the angle of the upright 13 by means of cap screws 144.

Gravitational displacement of the vertical shaft 140 juxtaposed to the upright 13 is prevented by a short sleeve 145 fastened to the shaft top by a machine screw 146. The sleeve 145 rides upon the upper face of the bearing block 143. Midway of the ends of shaft 140 is an arm 147 normal thereto and held thereon to rotate therewith by means of a set screw 148. The free end of arm 147 extends to the right and contains an eye 149 having a vertical axis.

A turnbuckle 150 comprising an apertured head 151 and a stem 153 having right and left hand threads at opposite ends, connects the lug 123 to the arm 147. A pintle 152 cojoins the head 151 to the eye 149, while the head and the lug 123 operatively engage opposite ends of the compoundly threaded stem 153. Between the ends of the stem 153 is a polysided section 154 making said stem adaptable to manipulation with a wrench.

Immediately above the cam 116 and upon the sleeve 87 and to rotate with said sleeve is a feed turret 155. Radiating horizontally from the hub 156 of the turret are legs 157 at sixty-degree intervals. Each leg terminates in an enlarged section forming a block 158; the blocks being joined by integral strap ligatures 159. A channel 160 of rectangular cross section communicates from the under to the upper side of the blocks 158.

Disposed in each of the channels 160 in a manner adapted to vertical reciprocation is a stem 161 of cross section congruent to that of said channels. The lower ends of the reciprocating members 161 have mounted thereon in an inwardly directed manner short brackets 162 having conical roller bearings 163 journaled to the innermost end. The bearings 163 are disposed within the race of cam 116 and conform to the converging opposed faces of the upper and lower parts 117 and 118.

Upon the upper end of each stem 161 is a feed cup 164 secured thereto, in a seated position, by bolts 165. The cups 164 are identical and compose a single solid casting. From an outer position on opposite edges of a dished seat 166 in a cup 164, rise side members 167 in continuation of the curve established in the seat. Likewise, a third curved member 168 projects upwardly from the innermost edge of the seat.

The member 168 is a pedestal having in its top face a cavity carrying a ball bearing 169. A base 170 for each cup 164 provides a horizontal flat face 171 centrally positioned relative to the cup, and a lug 172 projecting downwardly from the side of said face. The flat face 171 rests upon the top of stem 161 while the lug 172 fits closely along the side of said stem to co-receive a bolt 165.

To the outer face of the bearing blocks 158, and fastened by means of studs 173, are brackets 174 carrying roller bearings 175 adapted to rotate about a vertical axis provided by suitable journals in the ears 176.

The following will illustrate the manner in which the feed turret 155 is made to rotate in an intermittent manner for reasons to be made apparent later. First, it is disclosed that the belt pulley 25 is operated continuously in an anti-clockwise direction as viewed from the right side of the machine by means of any prime mover, not shown. The cone clutch member 30, which is feathered to the main drive shaft 26, is moved to the left by the operation of lever 35 and forced to engage the walls of recess 31 with the coniform shoulder 29 of the pulley 25.

Such engagement immediately causes the main drive shaft 26 and the pinion 43 to turn with the pulley 25. The pinion 43 transmits power to the gear wheel 53 to cause the latter, and the cam shaft 52 to which it is keyed, to rotate in a manner retrogressive to the main drive shaft. The resultant power imparted to the beveled pinion 106 is transmitted to the coacting gear 109 to turn the vertical shaft 108 and the sprocket 112 in a clockwise direction with reference from above.

It follows that the roller chain 113, through the agency of sprockets 112 and 95, propels the spindle 92 clockwise. As the eccentric cam member 96 is turned clockwise, the roller bearing 99 and projection 101 operate alternately with the slots 90 and arcuate sections 91 of the Geneva cam 89. The circular camming edge 102 exactly coincides with a face 91 and slides there against without imparting any rotary motion to the cam 89. In fact, the cam 89 is locked to bar rotation in either direction by the body 101. However, as the member 96 is rotated further and the shoulder 104 reaches the point in alinement with the two vertical shafts 86 and 92, there is no obstruction to an anti-clockwise movement of the cam 89.

Simultaneously with the alined position of the point 104, the roller bearing 99 makes contact with the forward edge of the presented slot 90. Continued turning of the shaft 92 causes the bearing 99 to advance inwardly of the slot 90 meanwhile imparting a rotary movement to the cam 89 (see Figure 10).

Subsequently, as the roller 99 egresses from the slot 90, the shoulder 105 starts entrance to the succeeding arcuate section 90 as an impediment to further rotation to the cam 89. Since there are six slots in the Geneva cam 89, six interruptions will be had during a complete revolution thereof. A like movement is impelled to the hexagonal feed turret 155, which is keyed mutually to the sleeve 87 with the cam 89.

The feed turret 155 and sleeve 87 turn independently of the cam 116, the latter being operated by the before described linkage from the cam 125, and at a predetermined instant while the turret 155 is stationary. The first movement of the cam 116 is had in a clockwise manner to elevate the feed cup 164 whose stem 161 bears a roller 163 at the foot of the incline 119.

Upward displacement of the feed cup 164 is incident to trimming the stem from a pear therein. A return, or anti-clockwise movement of the cam 116 is had simultaneously with the subsequent similar shift of the feed turret, so as to keep the roller 163 upon the culmination 121 and hence the stem 161 in an elevated position. The reason for elevating the feed cups, and traversing them in the elevated state, will be made conspicuous later after the stemming and splitting instrumentalities have been described.

The stemming device

The present machine has its order of operation as follows: First, after being placed in custody of the machine, the fruit is carried by the feed cups into engagement with a mechanism for severing the extreme end of the fruit bearing the stem. Being thus treated, the fruit is in a suitable condition for subsequent operations.

Figure 2:
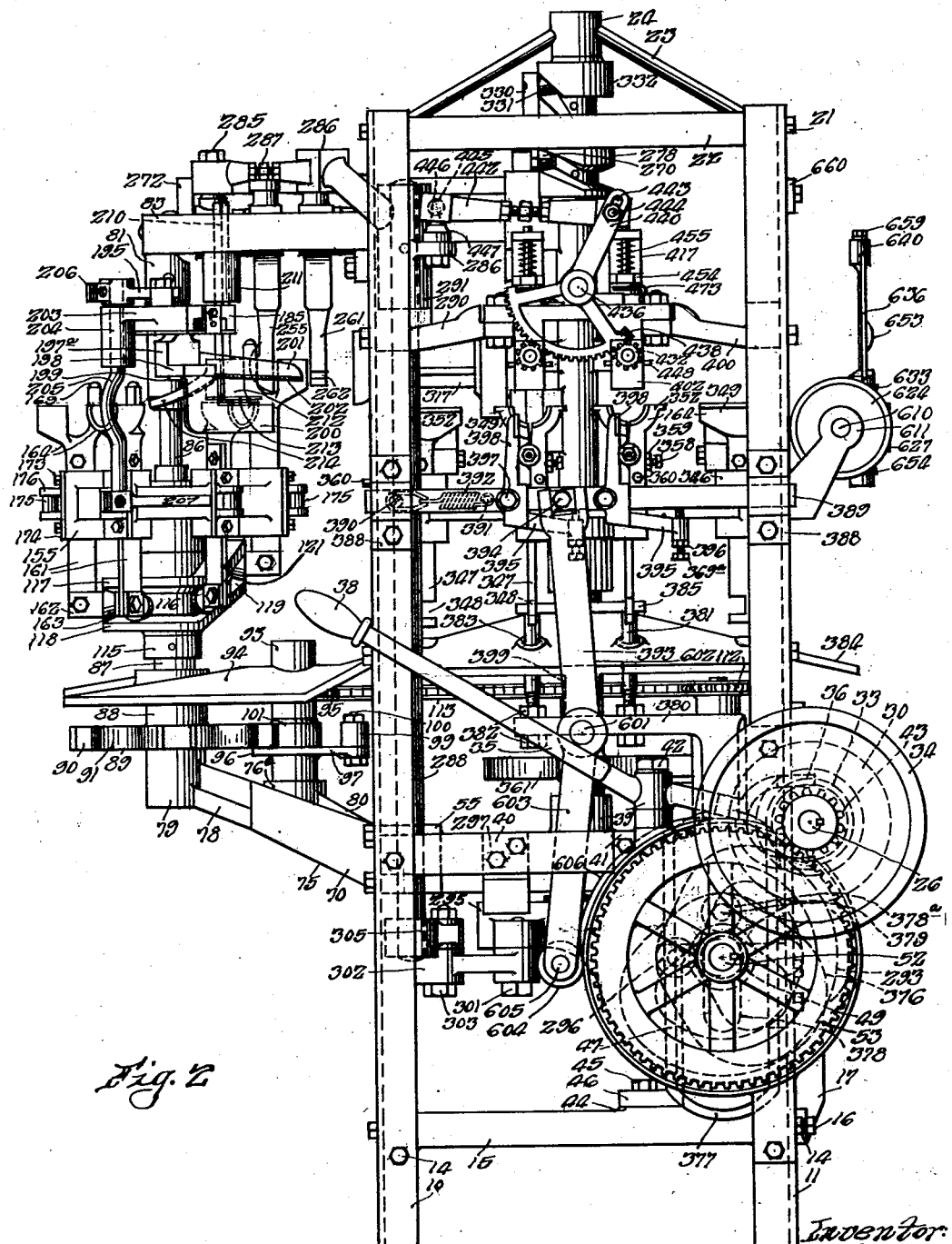
Figure 2 is a side elevation of the device shown in Figure 1 as taken from the right side.
Figure 6:
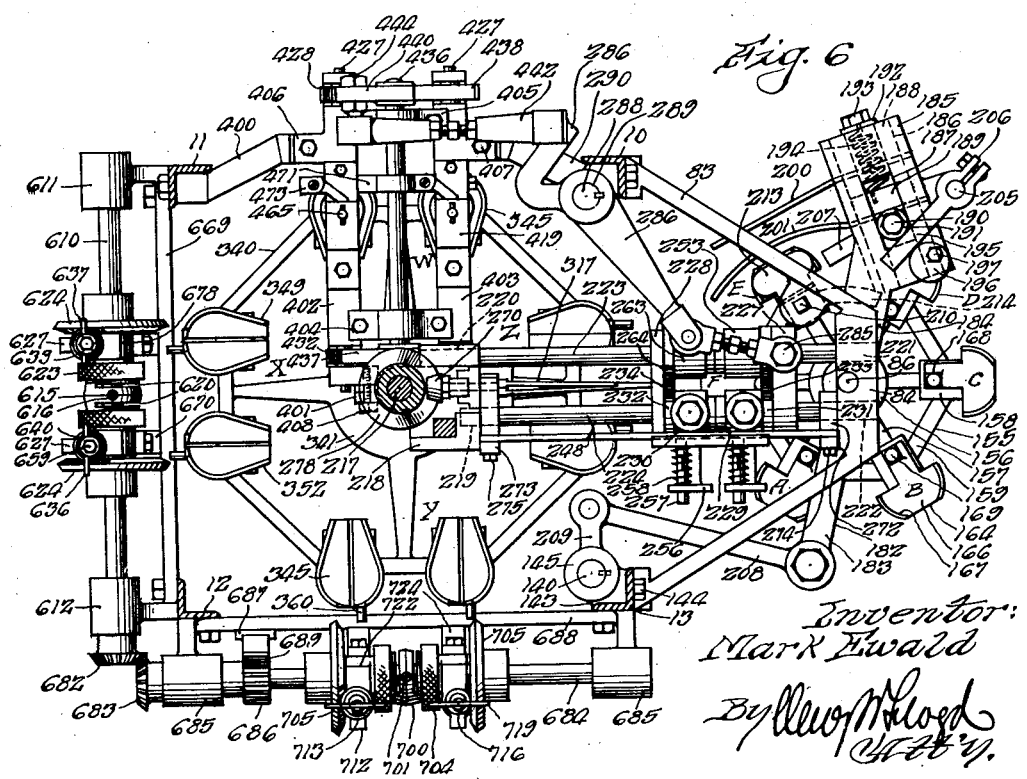
Figure 6 is a plan view of the device taken in cross section at the plane designated by the line 6—6 in Figure 5.

Reference to the Figures 1, 2 and 6 will be had conjointly in respect to the following description. Fixedly secured to the vertical shaft 86 and somewhat above the feed turret 155 is a narrow collar 180. Riding upon the collar 180 in a manner free to pivot about the shaft 86 is a long sleeve-like hub 181 depending from a compound lever 182. The counter parts 183 and 184 of the lever 182 are disposed at one hundred eighty degrees (see Figure 6).

The end of the member 184 comprises a rectangular channeled block 185 slightly angular to the body of the lever. The channel 186 is conterminate with the major dimension of the block 185 and is formed in the lower face thereof. Communication from the top face of the block is had to the channel 186 through a rectangular aperture 187 centrally spaced in said face.

On either side of the channel 186, and on the lower face of the block 185, are guide plates 188, secured in position by any suitable means as by cap screws and to project over the channel opening to partially enclose it. Carried upon the guide plates 188 in a manner to slide freely within the channel 186 is a cross head block 189. Anchored in the upper face of the member 189 is a pin 190 providing a journal for a roller bearing 191, the latter being projected upwardly through the aperture 187.

A thin plate lug 192 is fastened to the forward end of the block 185 by means of a stud 193, and in a way to project over the end of the channel 186. Between the lug 192 and cross head 189 is inserted a compression spring 194, which spring constantly urges the cross head inwardly of the channel 186. The inward movement is arrested by the roller 191 impinging a cantilever bar 195. In turn, the bar 195, which is contiguous to the upper face of the block 185, is limited in its movement, impelled by the roller bearing 191, by an adjustable obstruction in the form of an eccentric disc 196. It is apparent that by shifting the angular position of the disc 196 relative to its anchorage 197 that the inward progression of the block 189 may be regulated.

Depending from the lower face of the cross head 189 is an angle boss 197a having a foot 198. There is fastened by any means, such as welding, or by cap screws, to the bottom of foot 198, a sheet metal bracket 199. The bracket 199 supports at its lower end a second piece of sheet material comprising a stop 200. The other and free end of the stop 200 is projected horizontally with the main body of said stop lying tangential to a circle generated about the turret shaft 86, and of radius to form a cusp therewith. At the heel of the foot 198 is anchored the shank of a flat arcuate blade 201 having a sharpened lower edge 202.

Projecting laterally from the side of the block 185 is an ear 203 having depending downwardly therefrom a bearing 204 possessing a vertical axis. Within the bearing 204 is a shaft 205 operatively enjoined to the lever arm 195 by contraction of the split hub arrangement 206 at the end of said arm. Midway the ends of shaft 205 is an outwardly disposed deformation in horizontal alinement with the feed cups 164, so that no interference will be had by the shaft to fruit in said cup as it is conducted thereby. A second cantilever 207 is fixedly fastened to the lower end of the shaft 205 at an elevation mutual to that of the roller bearings 175. The extended end of the lever 207 projects into the arcuate path traversed by said rollers 175 as carried by the turret 155.

The component member 183 of the compound lever 182 is operatively connected to the shaft 140 by a linkage comprising the link 208 and arm 209. The means operating the vertical shaft 140 retrogresses to the cam 125 as before described in its relation to the loading mechanism.

A second element of the stemming device is in the form of a stem 210 of polygon cross-section slidably mounted in a boss 211 integral to the trapezoidal frame 84. The lower extremity of the stem 210 comprises an enlarged head 212. A plate 213 is secured to the bottom of the head 212, while a downwardly and inwardly curved finger 214 extends from the most forward facet of the head. The finger 214 is disposed in a circular vertical plane coinciding with that virtually containing the ball bearings 169. A position of vertical registration with the station of estoppel of the feed cup, incident to elevation thereof, is assumed by the plate 213. A downward position of the stem 210 and assembly is tended to be maintained by a gravitational urge.

The stemming device operates in conjunction with the movement imparted to the feed cups by the cam 116. Pears having been placed in the feed cups, with stem outermost, at any of the cup stopping stations, A, B, C, or D, the next intermittent movement of the turret will transport the pear and cup at station D to station E. Incident the shift of the feed turret, the roller bearing 175 depending from the wall of the block bearing the feed cup under observation, comes in contact with the side of cantilever 207 to turn the shaft 205 clockwise, thereby to force the cross head 189 outward through the agency of the lever 195 and the roller 191, and against the urge of the spring 194.

Such outward displacement of the cross head 189 also carries the abutment plate 200 and the curved blade 201 therewith so that the fruit carried in the feed cup in transit to station E will not abut the plate 200. Just before the station E is reached, the roller bearing 175 passes off the end of the arm 207 to allow the plate 200 to be pushed inwardly under the impingement of the spring 194 against the end of the pear, thus forcing it inward against the back member 168 of the cup 164. In this manner the blade 201, which is adjustable in its horizontal placement relative to the abutment plate 200, is measurably placed from the end of the pear to be severed.

Before the feed cup under discussion had reached the station E, the ball bearing 169 thereon had been in support of the head 212 by means of the curved finger 214 resting thereon. However, as the cup was advanced, the block 212 was lowered by the finger 214 presenting its upwardly inclined lower surface to the ball 169. The downward movement of the block 212 under the force of gravity brings the plate 213 to rest upon the fruit within the cup. It is evident that as the fruit reaches the station E, it is firmly held within the cup by a downward pressure exerted by the plate 213, and an inward pressure provided by the abutment plate 200 to press the back of the pear against pedestal 168.

At this time, a counter-clockwise movement is imparted to the shaft 140 to move the compound lever 182 in a clockwise direction and consequently the circular cam 116 in a clockwise direction. The movement of the cam 116, as before described, elevates the feed cup.

Incident to the raising of the cup, the end of the pear therein is brought against the lower and sharpened edge of the arcuate blade 201, which is being drawn by the turning of the lever 182, to sever the stem end from the pear. During the upward movement of the fruit, the stem 210 bearing the head 212 is pushed upward within the boss 211.

As soon as the severing operation is completed, the turret 155 is given a turn by the Geneva member 89 simultaneously with a like movement being imparted to the circular cam 116 with the result that the feed cup is carried to station F in the elevated position. Before the fruit was carried entirely from under the plate 213, the ball bearing 169 on the pedestal of the succeeding cup was carried beneath the extreme end of the downwardly curved finger 214, to prevent the plate 213 from being lowered into the path of the fruit subsequently to be disposed at position E. The stemmed fruit arriving at station F in the elevated position is at the proper height to be received by the instrumentality for carrying such fruit inwardly of the machine preceding further operations upon such fruit.

Claims to the stemming or bobbing operation are set forth in my prior Patent No. 2,161,806, issued June 13, 1939.

*The fruit conveying carriage*

A frame for partially supporting the fruit conveying carriage comprises a trapezoidal structure 84 having a side 82 adjoining the ends of converging members 83. The base of the members 83 are secured to the uprights 10 and 13 near their top by means of bolts 215. A co-support for the conveying carriage is provided in a long sleeve 216 containing the central vertical shaft 217 within the machine.

The shaft 217 is free to rotate within said sleeve. Integral with the top of the sleeve 216 and extending forwardly therefrom is a compound boss 218 containing apertures 219 and 220 communicating to the front facet. In alinement with the apertures 219 and 220 are like apertures 221 and 222 in the frame member 82. Carried within these holes are parallel track members 223 and 224.

A carriage for conveying the fruit inwardly of the machine slides upon the members 223 and 224. Said carriage comprises on either member identical sleeves 225 and 226 (see Figure 5). Adjoining the sleeves 225 and 226 at their ends are cross pieces 227 and 228 forming the forward and backward ends of the carriage. Rotatively positioned on the sleeve 226 are similar collars 229 and 230 providing at their furthest removed ends and contiguous to the end pieces, circular shoulders 231 and 232. The arcuate edge of the shoulders 231 and 232 have gear teeth 233 and 234 cut therein.

Projecting downwardly from the left side of the collar 229 is a single bracket 235 from which depends, by means of studs 236, the stem 237 of the prodding fruit clamp 238. The lower portion of the clamp 238 embodies a scoop 239 exposing the concavity 240 to the right; the heel 241 of the scoop being to the side most forward of the machine.

To the left face of the collar 229 is anchored by standard means 243 an offset bracket 242. The bracket 242 contains an aperture 244. Loosely carried within the aperture 244 is an end of a hinged rod 245. The opposite end of the rod 245, pintled at 246, co-supports a shoe 247 having a longitudinal groove, which slidably engages the slider bar 248. Positive contact of the shoe 247 with the slider bar 248 is had by means of a compression spring 249. The opposite side of the bar 248 serves as a race for a roller bearing 250 rotatively seated on a shoulder face 251 at the top of sleeve 229, and journaled to a bolt 252 centrally placed in said face.

Opposed to the collar 229 and upon the carriage rod 223 is a component collar 253 having teeth 254 meshing with the teeth 233. Depending from the collar 253, by means of cap screws 254a, is a fruit clamp 255 which is symmetrical and complemental to the clamp 238.

The collar 230 is operatively engaged to the slider bar 248 in the same manner as is the collar 229. A bracket 256 projects from the left side of the collar 230, and contains an aperture to receive an end of the pintled bar 257 upon which is a compression spring 258 to impinge the back of the shoe 247. The opposite end of the pintled member is embedded in the shoe 247. A clamp 259 is suspended from the collar 230 in exactly the same manner as is the clamp 238 suspended from the collar 229.

The lower end of the clamp 259 comprises a curved jaw 260 with the center of curvature to the right of the member. Coacting with the clamp 259 is an opposed and identical clamp 261 with a jaw 262. A collar 263 rotatively mounted upon the sleeve 225 contiguous to the collar 253 provides a support for the clamp 261, and is operatively engaged to the shoulder 232 by means of gear teeth 264.

In the front face of the compound boss 218, and mounted in a vertical position is a shouldered panel 265 containing a longitudinal slot 266. The slot 266 communicates from a groove 267 to the forward and outer face of the panel. A staff 268 bearing near its upper extremity a perpendicular journal member 269 for a beveled roller bearing 270, is arranged for vertical reciprocation within the trackage co-formed by the groove 267 and an opposed groove in the boss 218. Projecting from the side of the reciprocating member 268 through the slot 266 is a pin 271, the slot 266 being extensive to clear the limits of reciprocation of said pin.

It will be noted that the slider bar 248 is carried at the ends of two levers 272 and 273 by means of studs 274 and 275, both levers being non-rotatively mounted on opposite ends of the track member 224. The lever 273 which is inwardly of the machine, is compound and provides in the component part 276 a slot 277 (see Figure 1). Within the slot 277 is a cross head 277a pivotally mounted upon the pin 271.

Feathered to the vertical shaft 217 adjacently above the sleeve 216 is a circular cam 278 having a circumscribing camming groove 279 with an inclination 280 reaching an upper level at 281 to decline at 282. The beveled bearing 270 operates within the groove 279.

Figure 9:
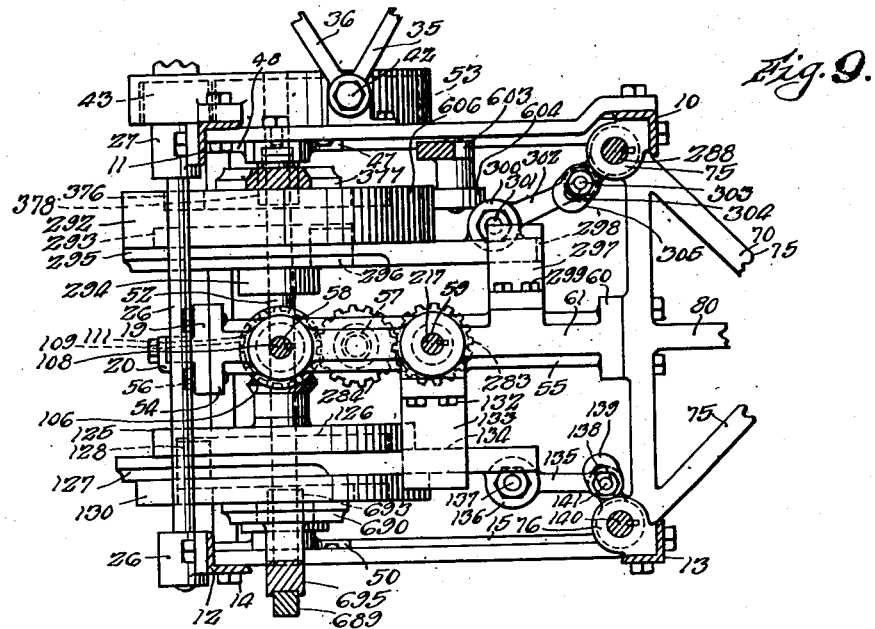
Figure 9 is a lateral and horizontal section taken through the machine as indicated by the line 18—18 of Figure 4.

Figure 9 illustrates the lower end of the shaft 217 journaled in the bearing 57. Said shaft carries a gear wheel 283 below the cross member 55. The gear idler 284 operating upon a stud shaft shrunk into the bearing 57 serves to transmit the clockwise movement of the annular toothed shoulder 111 to a like movement of the gear 283 and the shaft 217.

The following linkage is employed to propel the carriage for conveying the fruit from the feed cups. Near the right side of the front cross member 227 of the carriage is a threaded recess which receives the threaded stud shaft 285. Connecting the shaft 285 to the bifurcated end of a compound lever 286 is an adjustable link 287. A vertical shaft 288 is disposed within the angle of the upright frame member 10 to be rotatively co-journaled by a bearing 289 provided within the shank of the bracket 290 bolted to the upright 10, and the bearing 75.

Vertical displacement of the shaft 288 due to the force of gravity is prevented by the attachment of the lever 286 thereto at the upper end to pivotally bear against the upper face of the bearing 289. An integral offset hub 291 measurably spaces the lever 286 above the bracket support.

Figure 3:
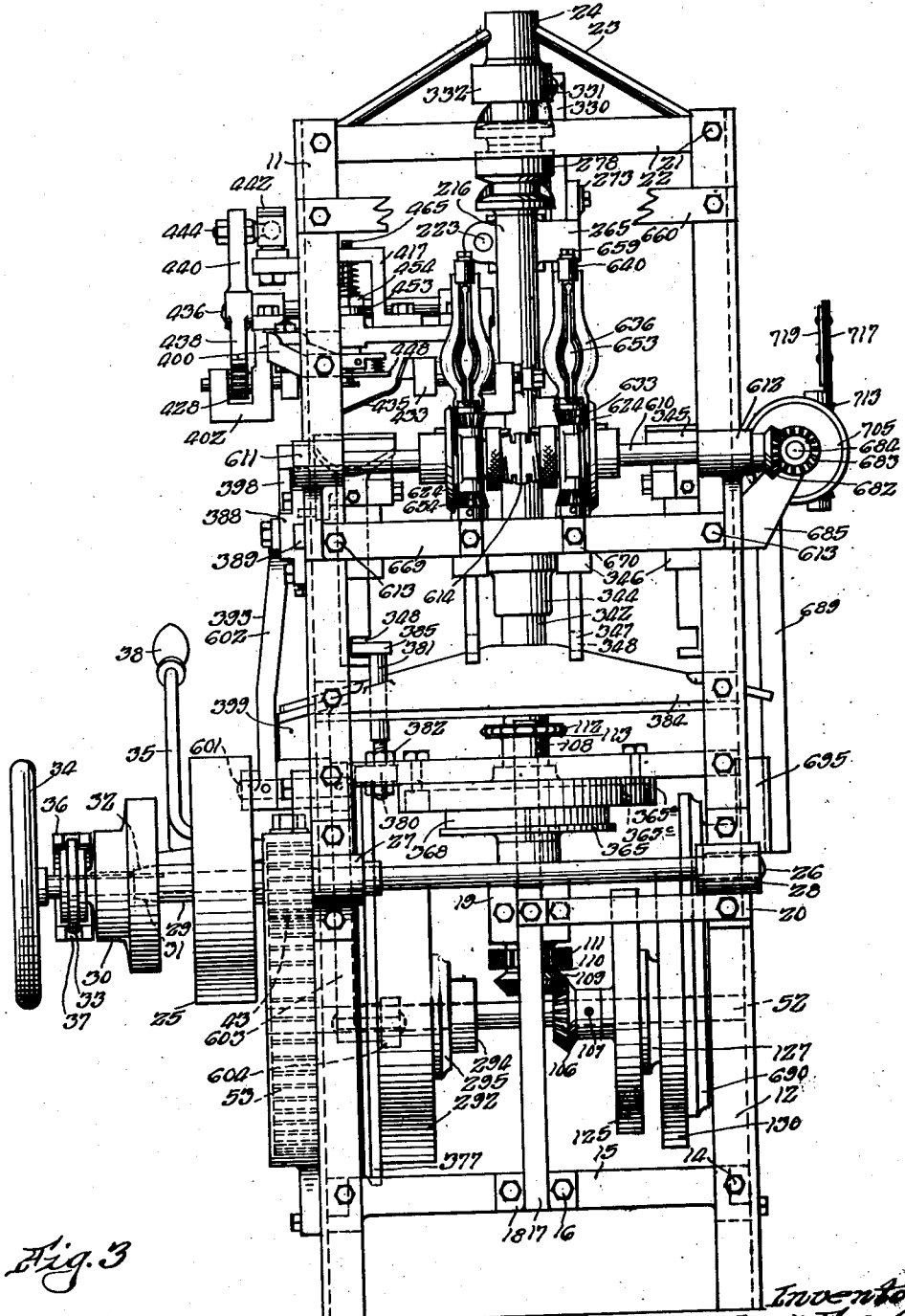
Figure 3 is an elevation of the same machine as viewed from the rear.

Reference to Figures 2, 3 and 9 will be had to clearly illustrate the transmission of locomotion to the vertical shaft 288. Keyed to the cam shaft 52 is a plate cam indicated by the numeral 292. In the left face of the cam 292 is an irregular eccentric groove 293 circumscribing the bearing for the shaft 52. Contiguously held to the left face of the cam 292 by means of a collar 294 upon the cam shaft is a cam follower 295 having a horizontal slot circumjacent said cam shaft. Said follower supports near the front end of the slot a roller bearing 296 operatively contained by the groove 293.

A guide bracket 297, providing a transverse groove 298 in its lower facet, is held to the right side of the cross member 55 by means of bolts 299. The forward and top side of the cam follower 295 tracks within the groove 298 as a guide while it is reciprocated by the cam 292.

From the forward and right side of the cam follower 295 projects an ear 300 drilled and tapped to receive in a vertical manner a bolt 301. A link 302 is held above the head of the bolt 301 and under the ear 300 in a changeable angular position to present a wrist pin 303 in the extended end thereof in registry with a slot 304 near the end of a cantilever 305, the latter being fixedly attached to the lower end of the shaft 288.

Figure 5:
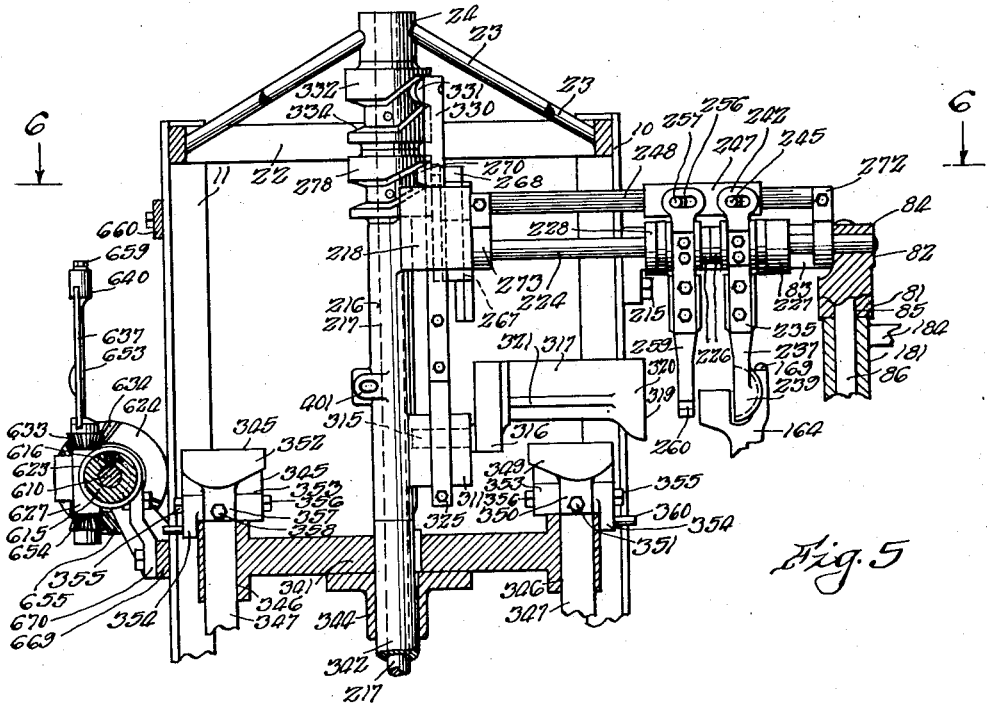
Figure 5 is a fragmentary sectional view of the upper portion of the machine as taken through a vertical central section.

Operation of the fruit conducting carriage is had conjointly with the linkage terminating at the cam 125, and with the slider bar 248, the latter being operatively connected to the circular cam 278. In the operation of conveying the fruit from a feed cup at station F the carriage is delivered to its foremost position upon the rods 223 and 224 with the appendages 237, 259, 255, and 261 in a spread position as illustrated in Figure 5.

At this time, the slider bar 248 is moved upwardly and radially with the rod 224 due to the force imparted to the lever 273. It will be recalled that the vertical operating shaft 217, during the operation of the machine, is rotated in a clockwise direction. Therefore, as the carriage is in the forward position with its clamps hovering about the fruit in the feed cup, the circular cam 278 is brought to the position presenting the starting point of the inclination 280 adjacent the roller bearing 270. Continued movement of the circular cam shifts the inclination 280 beneath the roller bearing, to elevate it.

When the fruit has been clasped within the fruit carriage clamps, a subsequent movement of the circular cam 116 of the feed turret mechanism in a clockwise direction as heretofore described lowers the feed cup at position F. Concurrently, the cam follower 295 is moved to the rear by the plate cam 292 to impart motion to the linkage there inter-connecting and the forward cross member of the carriage, to move said carriage inwardly the machine.

The upper plane 281 of the groove in circular cam 278 is of some extent and sufficient to maintain the staff 268 in the upright position and hence the slider bar 248 in its downward position all the while that the carriage is being moved inwardly of the machine. The inward movement of the carriage is great enough to convey the pear beyond the edge 319 of a bit 317 of the splitting device later to be described. It will be noted that the heels 241 of the scoops configuring the lower ends of the fruit clamps 237 and 255 are behind the larger end of the pear and serve to prod it inward against the slight resistance offered by the cutting edge of the bit 317.

The fruit before being fed to the machine is graded to a standard size. However, even in graded fruit there are slight variations as to size. Therefore, the fruit clamps of the fruit conducting carriage are closed in a semi-positive manner. As the fruit clamps come in contact with the pear any great pressure thereon is prohibited by the springs 249 and 258.

A continued arcuate movement of the slider bar 248 after the fruit clamps have been stopped by coming in contact with the fruit, will carry its surface contiguous the roller bearing 250 therefrom, and simultaneously press the shoe 247 to the left thereby buckling the bar 245 at its pintled section 246, and forcing the end of the rod 245 through the aperture 244 against the urge of the springs 258 and 249. The rod 257 is similarly displaced.

Claims to the loading mechanism are set forth in my application Serial No. 621,914, filed July 11, 1932.

The splitting mechanism

Anterior to being peeled by the machine, the fruit is split in half longitudinally of its core. Each portion of the pear so halved then has its epidermis removed by different parts of a coordinating instrumentality. Incidentally, division of the fruit in this conventional manner for canning tends to ameliorate the peeling process.

A conjugate reading of Figures 5, 6, 7, and 8 should be had in affiliation with the following description. First, a support for the splitting members 316 is provided in the form of a cubical boss 311 integral to the forward and lower side of the sleeve 216. Transgressing the boss 311 from left to right is a deep channel 312, opening to the top and the two said sides of the block. Costationed rotatively within the juxtaposed bearings 313 communicating from the entrenchment 312 to the forward face of the boss 311 and aligned recesses 314 in the rear wall of said entrenchment, are stems 315 projecting perpendicularly from the hinged members 316.

Inlaid in the right face of the left member 316 is a bit 317 to extend forward in contiguous parallelism to a congruitous leaf 318 extending forwardly from the opposed face of the right member. The bit 317 presents at its forward end a keen cutting edge 319 with the shoulders 320 receding therefrom at a very acute angle. On the outer sides of the bit 317 and the complemental leaf 318 are horizontal embossments 321 and 322 respectively. These ridges 321 and 322 are for the purpose of preventing a vacuum occurring between the respective faces bearing the ridges and the flat side of a halved pear, as will be explained more detailedly later.

Upon the sections of the pintle members 315 confined within the channel 312 are keyed segmental pinions 323 which engage the racks 324 and 325. The pinion 323 to the left engages the rack 325 that extends downwardly through a guide slot 326 within the boss 311 and below said boss. The other rack 324 operates in a similar slot 327 on the opposite side of the boss 311 and extends therebelow where a cross piece 328 enjoins the two racks by means 329 to hold them in fixed assembly. A vertical shaft 330 somewhat offset from the rack 325 projects upwardly through a guide provided in the compound boss 218. The upper end of the shaft 330 carries upon a stem normal thereto a truncated roller bearing 331.

Between the central crown bearing 24 rotatively containing the end of the vertical drive shaft 217 and the circular cam 278, is a circular cam 332 not unlike the cam 278. The cam 332 presents a circumscribing groove 333 having a lower level 334 and an inclined section 335 leading upwardly from the lower level to a higher plane 336. In chronological order and following the higher plane 336 is a declination 337 leading to the lower plane 335. This circular cam 332 is fixedly attached to the shaft 217.

Noting that the shaft 217 rotates in a clockwise direction, it will be seen that the fruit clamps of the fruit carriage will be spread to release the fruit after having carried such fruit beyond the edge of the bit 317 anterior to the spreading of the parts 321 and 322 by the operation of the roller bearing 331 within the declined section 337 of the groove 333. Thus, the fruit clamps are cleared of the fruit and nothing impedes the outward displacement of the two halved portions of the fruit by the hinged members 321 and 322 to deliver said halved portions to the fruit cups below.

Claims to the splitting mechanism are set forth in my application Serial No. 201,838, filed April 13, 1938.

The fruit turret

Within the machine is an octagonal figure comprising a turret 340. The turret has a hub 341 centrally positioned therein and non-rotatively engaged to a sleeve 342. The sleeve 342 carries at its upper end a flanged member 344 which is fixed to said sleeve to prevent a longitudinal displacement of the turret. The sleeve 342 is circumjacent to the shaft 217 and extends downwardly to pivotally rest upon the cross member 55 about the bearing 59. Freedom of movement of the shaft 217 within the sleeve 342 is provided.

Reference to Figures 5 and 6 will be had to render a more detailed depiction of the turret. Quadrantly spaced about the edge of the turret 340 are spaced apart fruit holding means preferably in the form of fruit cups 345 arranged in pairs. An intermittent motion is imparted to the turret turning it ninety degrees during each movement and positively stopping the turret with the pairs of fruit cups at the stations W, X, Y, and Z.

Each of the eight corners of the feed turret 340 presents a vertical bearing 346. Within the bearings 346, which are rectangular in cross section, are shafts 347 of congruent cross section arranged for vertical reciprocation within the bearings. The innermost edge of the shafts or bars 347 has a notch 348. Mounted upon the top of the stems 347 is a half 349 of a fruit cup having a lug 350 extending downwardly along the side of the stem 347. A stud bolt 351 passing through the lug 350 and into the stem 347 insures the position of this fixed half cup. The concavity in the upper face of the cup is such as to conform to the skin-bearing surface of a half section of a pear having its end of lesser diametric cross section inward the machine.

Opposed to the half cup 349 is a complemental cup segment 352 bearing a concavity identical to that of the section of the cup designated by the numeral 349.

Shallow grooves 345a are cut in the cup walls in a manner having their center of curvature coincident with the axis of generation of said walls. The grooves are bounded by vertical sides 345b (see Figure 11). Downward pressure on the fruit concurrent to peeling, forces that portion of the peel over the corrugations 345a into the grooves to result in less frictional impedance to the passing of the paring knife and thus relieve the knife of distortional strain. The subject matter just described is not claimed herein but is claimed in applicant's co-pending application Serial No. 627,549, filed August 5, 1932.

The movable cup segment 352 has depending from the inner and outermost ends two abutments 353 and 354. These abutments fit closely upon the two sides of the stem 347 and contain apertures on a mutual axis which coincide with recesses in the adjacent sides of the reciprocating member 347 to co-receive bolts 355 and 356 about which the movable segment is free to oscillate. A second depending member 357 projects downwardly from the cup segment 352 in a manner somewhat offset from the broad face of the staff 347.

The lower end of the appendage 357 has a threaded aperture into which is screwed a bolt 358, the latter being screwed inwardly until its threaded end abuts the staff 347. The center of gravity of the cup member 352 is such that it tends to rotate about the bolts 355 and 356 to keep the cup members slightly apart. Since the bolt 358 is below the linked section of the movable cup part 352 a continued screwing of said bolt after the end has come in contact with the reciprocating member 347 will rotate the cup section in a manner to bring it adjacent to the stationary cup member.

A lock nut 359 may be placed upon the bolt 358 in order to hold the bolt in place once it has been set to hold the fruit cup 345 in its desired adjustment. Projecting outwardly from the side of the abutment 354 is a stop 360. It will be noted that a displacement of a pin 360 to the right, Figure 2, will pivot the cup member 352 in a manner to close the cup 345.

The intermittent motion before referred to is transmitted to the turret by means of a Geneva cam 361 feathered to the lower end of the sleeve 342. The cam 361 is in the form of a plate having alternately spaced about its periphery four slots 362 and four arcuate sections 363. At either edge of a slot 362 and as figures of demarcation intermediate the arcuate sections 363 and slots 362 are points 364. Keyed to the shaft 108 in a plane just below that described by the Geneva cam 361 is a circular plate 365.

From one edge of the plate 365 projects a section 366 having a peripheral edge 367 generated about the axis contained within the shaft 108. Upon the plate 365 lies flatly a circular cam plate 368 within the plane common to the Geneva cam 361. Removed from the plate 368 is a portion leaving a concave curved edge 369. At the intersection of the curved edge 369 and the circular edge 370 of the cam 368 are shoulders 371 and 372. A slot 373 within the projection 366 has a greater dimension radially of the plate 365 and carries a stud 374, upon which is a roller bearing 375.

Cooperation of the roller 375 and the cam plate 368 with the irregularities 362 and 363 of the cam 361 is had in the exact manner as previously described in the operation of the Geneva movement of the feed turret. Here, however, since there are but four slots about the cam 361, the cam is turned ninety degrees during each impulse.

In this manner intermittent motion is given indirectly by virtue of the sleeve 342 to the fruit turret, which allows the fruit cups to stay in one of the positions W, X, Y, or Z for a short period of time prior to a subsequent ninety-degree shift of position.

A circular plate 365a having a flange 365b and a groove 365c is about the shaft 108 above the cam 368. The plate 365a is held stationary by a strap brace extending between the frame members 11 and 12. The groove 365c is of such a contour as to properly guide the stub shaft 374 and the roller 375 into and out of the grooves 362 by sliding the shaft 374 in the slot 373. A roller (not shown) upon the shaft 374 above the roller 375 operates within the groove 365c.

In the right face of the cam 292 is an eccentric groove 376 circumscribing the hole in said cam containing the cam shaft 52. Placed flatly against the right face of the cam 292 is a cam follower 377 having a slot 378 therein of vertical extent to contain the cam shaft 52 and allow vertical displacement of the cam follower 377. Extending normally and to the left of the face of the cam follower 377 and contiguous to the cam 292 is a short stem 379 carrying the roller 378a, the latter projecting into the groove 376.

The cam follower 377 extends upwardly. From the upwardly extended portions depends in a horizontal plane an arm 380. Carried toward the forward end of the arm are two vertically disposed posts 381, and spaced at an interval equal to that interval between the pairs of stems supporting the fruit cups. The posts 381 are held in place in a manner adjustable as to vertical position by means of nuts 382. Said posts project upwardly through apertures 383 provided in the hood section 384.

Suitably secured to the tops of the posts 381 is a cross piece 385 to project outward therefrom in the manner illustrated in Figure 3. The posts 381 are adjusted to a height to present the cross bar 385 in the same horizontal plane as the slots 348 within the stems 347 of the fruit cups when said stems 347 are in a lowered position.

The posts 381 are at station W and as the turret carries a pair of fruit cups to this station the cam 292 lifts the cam follower 377 to thereby raise the horizontal arm 380 and the posts 381 thereon to elevate the fruit cups by the engagement of the cross piece 385 with the slots 348 provided within the staffs 347. In this manner the fruit that was deposited within the cups at station Z is elevated with the cups to bring the flat face of the halved fruit in contact with the fruit pads 448, later to be described.

The fruit cup closing mechanism

To the left sides of the uprights 10 and 11 at an elevation equal to that of the fruit turret are brackets 388. Loosely held between the brackets 388 and their respective upright members is a bar 389. The bar 389 is adapted to horizontal reciprocation within its supports. To the left side of the upright 10 is a hook 390, and on the same side of the bar 389 is a pin 391. Between the pin 391 and the hook 390 is expanded a contraction spring 392, which holds the bar 389 in a forward position limited by the bifurcated end of the compound lever 393 bearing against the bolt 394.

On either side of the bolt 394 and attached to the right side of the bar 389, are similar angular lever arms 395. Said levers 395 are fixedly held in a given angular position as obtained by the adjustment of the lock nut and screw arrangement 396. Bolts 397 at the angle of the levers press the side of said levers firmly against the side of the bar 389. It will be noted that the upright components 398 of the levers 395 are spaced at an interval equal to that interval between the pairs of the fruit cups in the feed turret, and that said components are in the same vertical plane as the pins 360 projecting to the left of the movable element of the fruit cups.

Depending from the right central edge of the hood 384, which is co-supported by the four corner uprights of the machine, is an inverted standard 399 providing at its lower extremity a horizontal bearing 600 (see Figure 10).

Within the bearing 600 is a short fulcrate member 601 having pinned to opposite ends the upper and lower parts 602 and 603 respectively of the compound lever 393. The lower end of the member 603 is forked and carries between the opposed parts of the fork a roller bearing 604 upon the axle 605. The circular plate cam 292 has upon its periphery a curved strip 606 which is thick in its central body and diminishes in thickness near its ends. The roller bearing 604 is presented to the periphery of the cam 292 to roll thereon, and is kept in a fixed horizontal position until the strip 606 is blocked thereagainst to bring about a displacement to rotate the compound lever 393 about the pivot 601. As soon as the curved strip 606 has passed beneath the roller 604, the horizontal bar 389 is returned to its forward position by the spring 392.

The purpose of displacing the bar 389 in the manner just described is to bring the upright members 398 against the pins 360 and to close the cups 345. The closing operation is had concurrently with the peeling movement of the paring blade 435, and coacts with the peeling pad 448 to firmly grasp the halved fruit and secure it against rotation due to the force of the blade as it passes therethrough.

Adjustment for different sized fruit may be had by a manipulation of the screws 369a. It will be noted that if screws 369a are turned in a manner that they will be lowered the upper part 398 will be in a more forward position so that the pins 360 will not be moved so far with the result that the fruit cups will not be so nearly closed. Hence, by such an adjustment, a larger fruit may be handled in the cups without pinching or bruising the same. It will be noted that the lever components 398 are lengthy and extend upwardly so that they will engage the pins 360 when the fruit cups are in the elevated position incident to the peeling operation.

The peeling mechanism

Directly over the station W of the fruit turret is mounted an instrumentality for performing the peeling operation upon the fruit when it is brought in engagement therewith by the elevation of the fruit cups at that station. A trisupport for such peeling mechanism is provided by brackets 290 and 400 which are secured to the uprights 10 and 11 respectively, and an apertured lug 401 projecting from the rear side of the sleeve 216.

Frame members 402 and 403 are identical, and are conjoined by aligned journal members 404 and 405. Lugs 406 are provided near the right ends of the frame members 402 and 403 for attaching the brackets 290 and 400 by means of bolts 407. The left end of the frame member 402 abuts against the side of lug 401 to present a threaded hole therein in registry with the aperture of said lug to receive with said aperture a stud 408.

The right and outermost end of the members 402 and 403 configures a transverse channel 409. The outer and inner walls of the channel 409 contain aligned bearings 410 and 411, respectively. The inner wall extends upwardly to have seated thereon an end of the journaled member 405.

Further inwardly in the top face of the frame members 402 and 403 is a second pair of transversely aligned channels 413. Positioned inwardly of the channels 413 are bosses 414 having a smooth top end 415 and a central vertical hole 416 conterminate with the vertical dimension of of the boss. A Z bracket 417 is firmly held to the top face of each member 402 and 403 by means of a stud 418. The horizontally disposed section 419 of the bracket 417 provides an aperture 420, the axis of the latter coinciding with that of the hole 416. To the top of the wall 421 comprising a side of the channel 422 the bearing member 404 is positioned by means of cap screws 423.

The walls 424 comprising the left end of the oddly shaped frame members 402 and 403 form a side of the entrenchment 422. Bearings 425 and 426 are within the walls 421 and 424 on a mutual axis.

A short shaft 427 is rotatively disposed within the bearings 410 and 411, and has keyed thereto within the entrenchment 409 a small gear wheel 428. The inner end of the shaft 427 has firmly fastened thereto a collar 429 having an angularly terminated lug 430. A shaft 431 within bearings 425 and 426 bears a pinion 432 between the walls 421 and 424, and is adapted to turn about an axis common to shaft 427. Opposed to the collar 429 and upon the end of shaft 431 is an identical collar 433 which bears a similar lug 434. Supported by the collars 429 and 433, and the lugs 430 and 434, is a paring blade 435, configuring the longitudinal contour of a pear.

Confined for rotation within the journals 404 and 405 is a shaft 436. To the inner end of the shaft 436 is fixedly attached a segmental gear 437, which engages its tooth bearing periphery with the gears 432. The opposite end of the shaft 436 has keyed thereto a segmental gear 438, the latter meshing its arcuate tooth-bearing section 439 with the pinions 428. An arm 440 extends radially from the hub 441 of the gear 438 to be operatively engaged to an adjustable link 442 by means of a slot 443, and a pin 444 passing through said slot into an end of said link.

It will be observed that the opposite end of the link 442 has a socket 445 into which is inserted a ball 446 upon a post 447 to complete a ball and socket joinder between the link and the right end of the compound lever 286. The intermittent oscillating movement of the vertical shaft 288, as before described, is transmitted through the agency of the link 442 to the segmental gear 438, thence by way of the shaft 436 to the complemental segmental gear 437.

Thus, the short shafts 427 and 431 are operated independently so that torque is applied at both ends of the blades 435. The angle of oscillation imparted to the segmental gears is such that a blade 435 is rotated from a horizontal position at one extremity of oscillation, downwardly and through more than one hundred eighty degrees to slightly above the opposed horizontal position. The sharpened edge of the blades 435 is presented downward when they are in the most forward horizontal position or when the segmental gears 437 and 438 are at the most counter-clockwise position of their oscillating arc as viewed from the outward side.

While the blades 435 are in the horizontal position to the front and ready to make a subsequent cutting movement, the fruit cups which have arrived at the station W are elevated by the posts 381 in the manner previously described, to bring the flat severed surface of the halved fruit upward impinginly against means for contacting the flat or cut face of the half fruit adapted to prevent turning or shifting of the half fruit in the fruit holding means during the cutting operation. In the present disclosure this means is specifically shown as fruit contacting devices, preferably in the form of pad-like elements 448, adapted to contact the flat face of the half fruit preferably while the peeling movement of the blades is enacted. The blades 435 pass through the fruit just under the epidermis which remains in the cup until removed by the instrumentality at the subsequent station Y.

The mechanism in connection with the pads 448 whose object it is to hold the halved fruit in the fruit cups against turning with the paring blade, will now be described.

Within the vertical hole 416 in the boss 414 is a hollow stem 449 provided with an enlarged head 450 at the bottom thereof. The hollow 451 within the stem 449 is coextensive with the stem and the head 450, but is of decreased diameter above the inverted shoulder 452. After the stem 449 has been inserted within the hole 416 from the bottom, a collar 453 and a nut 454 are respectively shrunk and screwed upon the upper threaded end of said stem. The stem 449 is constantly held in a downward position, as is limited by the collar 453, by a compression spring 455 exerting a force between the horizontal section 419 of the bracket 417 and the nut 454. The tension of the spring 455, and hence the amount of its downward urge, may be regulated by shifting the position of the nut 454 relative to the collar 453. For instance, turning the nut 454 in a manner to raise it will result in a greater compression of the spring 455 and a proportional increase in its expansive effort.

To the left of the hollow 451 within the head 450, said head contains a recess 456 enclosed by opposed walls 457. Within the walls 457 are aligned apertures 458 providing bearings for a pintled member 459 which carries intermediate the walls 457 a lug 460 integral to the top face of the pad 448. Protruding to the left of the top of the inverted recess 456 is a tongue 461 having a short lug 462 projecting downwardly therefrom.

Between the lugs 462 and 463 is a short compression spring 464. Extending upwardly through the hollow 451 is a stem 465 having at its lower end a small knock-out pad 466. Said pad 466 is of proper dimensions to seat within the recess 467 congruent thereto and in the fruit pad 448. When there is no pressure exerted upward upon the small knock-out pad 466, the stem 465 is held in a downward position as illustrated in Figure 7 by the effort of a small compression spring 468 seated against the shoulder 452 and pressing against a pin 469, the latter extending through the stem 465.

Further downward displacement of the stem 465 and the pad 466 is overcome by a transverse pin 470 abrupting the top of the bracket 417.

Slidably seated within the entrenchments 413 of the two frame members 402 and 403 is a bar 471 substantially square in cross-section. Reference to Figure 8 discloses a transverse slot 472 within the bar 471 midway its two ends. Upon the top face of the bar 471 are two identical pad locking members 472 having horizontally disposed jaws 474 and flanges 475 in parallelism to said jaws to serve as a means for anchoring said members with the aid of set screws 476. Extending over the channel in the frame member 403 is a small plate 477 held in place by a stud 478. Also transversing the frame member 403 in an aperture 479 is a pin 480 threaded upon its forward end to receive nuts 481. The rearmost end of the pin contains a small hole 482. To the back of the entrenchment 472 is a screw 483 holding beneath its head one end of a contraction spring 484 the other end of which spring is hooked within the hole 482.

The action of the spring 484 is to provide a constant forward pull upon the bar 471 thus tending to keep the bar in a position as is limited by the plate 477 engaging the base 475 of the forward padlocking or holding means 473. When the bar 471 is in the most forward position the jaws 474 of the padlocking or holding means engage a groove 485 within the collars 453, thus preventing any upward movement of the fruit pads 448 as would otherwise be possible by compressing the spring 455.

The shaft 436 contains a peg 484a which projects radially therefrom. Normally the peg exerts a pressure upon the rearward wall of the notch 472, and prevents a forward movement of the bar 471 so that the jaws 474 may not engage the grooves 485. However, the clockwise rotation of the shaft 436 near the end of that movement frees the pin 484a from the notch wall to permit the spring 484 to urge the jaws 474 into engagement with the grooves 485. Release of the bar 471 by the pin 484a occurs while the paring knife is making its upward stroke through the fruit. Thus the jaws 474 positively maintain the fruit pads 448 in the downward position so that the fruit can not creep upwardly under the upward movement of the knife. This positive retention of the fruit being peeled relieves the paring blade of undue stress and insures that the upper edge of the fruit will not be broken off by a side swipe of the blade.

It will thus be seen that I have provided a plurality of relatively movable means which are adapted yieldingly to hold the fruit therebetween during the cutting operation, and that I have provided additional means for preventing the relative yielding movement between the holding means during at least a portion of the cutting movement, specifically the finish of the cutting movement, so as to provide a clean cutting of the fruit. Specifically, by holding the pad positively against yielding movement during the time that the peeling blade is moving upwardly, I provide means for retaining the fruit in its level seated position within the cup. I have found that in instances where the fruit is exceptionally firm, tending to hardness, as in the case of partially unripe fruit, if the holding means were not positively held the resistance of the spring for holding the pad against the fruit tends to be overcome by the upward pressure of the blade, which permits the fruit to tilt slightly in the cup. This tilting or skewing of the fruit within the cup lets the edge of the severed face at which the knife emerges from the fruit to be raised above the cup wall. Sometimes, if this should occur, the knife would not make a clean cut at its point of emergence. In short, the upper edge of the fruit would not be backed by the cup wall and a small corner of the fruit might be torn loose instead of being cut cleanly. Therefore, in order to prevent this, I lock the pad or hold it against displacement during the upward sweep or movement of the knife. Excepting at the time the knife is making such upward cut, the action of the spring alone has been found sufficient to maintain the proper position of the fruit, and, therefore, it is preferred that during this time the fruit be yieldingly held. The device herein set forth, therefore, is arranged for positively holding the fruit only during the relatively short interval of time when it is necessary. At other times the fruit is yieldingly held within the cup between the resilient pad and the cup members, which, as before stated, are moved upwardly with the pear therein to contact the yieldable pad. This construction permits slight variations for the slightly variant sized fruit, and likewise prevents the pressing of the fruit too firmly between the movable holding means.

It is understood that various types and forms of relatively movable holding means for holding fruit therebetween, and particularly for holding half fruit therebetween, are within the contemplation of my invention; that the invention is not confined specifically to the holding means shown, nor to the exact type of cutting means or peeling means shown, as any type of holding and cutting means may be contemplated within the scope of the appended claims.

Subsequently, as the peeled fruit is lowered by the fruit cup as actuated by the cam 292, the small knock-out pad 466 presses the fruit away from the face of the pad 448. If it were not for the small knock-out pad 466 the vacuum created between the flat face of the fruit and the fruit pad, combined with the viscous nature of the fruit juice, would cause the fruit to adhere to the fruit pad. The spring 468 urging the knock-out pad downwardly at all times is of a strength sufficient to knock the fruit from the fruit pad, but not of a stiffness to injure the fruit when said fruit displaces it into the seat 467 incident to being pressed against the fruit pad.

Subject matter not claimed herein is claimed in other of my pending applications.

What is claimed as new and is desired to be secured by Letters Patent of the United States is:

1. In a fruit treating apparatus, peeling mechanism comprising a pad, a fruit holding cup, a support for said pad, said pad being movable relatively to said cup, yielding means upon said support for urging said pad toward said cup, a peeling blade having an axis of rotation substantially within and in parallelism with the plane of said pad, means for rotating said peeling blade to remove the peeling from a fruit in said cup, and means for locking said pad against the fruit in said cup in the position occupied by said pad in respect to said cup under the urge of said yielding means and operating in synchronism with the movement of said blade.

2. A fruit peeling apparatus comprising a frame, a cup, a curved blade movable through said cup, aligned members journaled in said frame and engaging the end of said blade, means for oscillating said journaled members, a peeling pad reciprocally supported intermediate said journaled members, means for yieldingly urging said pad in one direction, and locking means to fixedly hold said peeling pad in the position to which advanced by said urging means incident to movement of the blade to a predetermined position.

3. Half fruit treating apparatus comprising relatively movable opposed members for holding a fruit, one of said members being shaped to contact the cut face of the half fruit, a knife movable in a path between said opposed members, one of said holding members having a yielding support means, and means for locking said yieldably supported holding member against yielding during a part only of the movement of said knife.

4. Half fruit treating apparatus comprising a cup having an open top adapted to hold a half fruit, a pad to close such open top and to contact the cut face of the half fruit, a knife movable in a path between said cup and pad, a yieldable support for said pad, means providing relative movement between the cup and the pad, the position of the pad relative to the cup being determined by the size of a fruit in said cup, and means for locking the pad against movement after the pad engages a fruit in said cup.

5. Fruit treating apparatus comprising a fruit receptacle, a pad over said receptacle, a yielding support means for said pad, a blade rotatable on an axis in the plane of said pad, actuating means for said blade, means changing the relative position of said receptacle and of said pad to hold fruit therebetween, means effective as said blade moves in the direction of said pad for locking said pad against movement, and means preventing adhesion between said fruit and said pad.

6. Fruit treating apparatus comprising a fruit receptacle, a pad over said receptacle, yielding support means for said pad, a blade rotatable about said pad, actuating means for said blade, means changing the relative position of said pad and of said receptacle to hold fruit therebetween during rotation of said blade, and means effective as said blade moves in the direction of said pad for locking said pad against movement.

7. In a fruit treating device, a cup for a half fruit, a pad depending over said cup, a yielding support for said pad, means for bringing said pad and cup together to yieldingly hold a fruit therebetween, a knife movable from one side of said pad to the other side thereof, and means operable during a part of the movement of said knife for locking said cup and pad in the spaced relationship occupied by said pad in respect to a fruit therebetween.

8. In combination, a cup, a pad having a plane face, means for relatively moving the cup and pad toward one another about a half fruit, means for compensating for differences in the sizes of successive fruits and determining the spaced apart position of said cup and pad, means locking the cup and pad upon a fruit in a compensated position, and a knife having an axis parallel to the plane of said pad for operating on the fruit while said pad and said cup are in locked position.

9. Fruit treating apparatus comprising relatively movable fruit holding means for holding a half fruit therebetween, one of said means adapted to embrace the convex portion of the half fruit and the other adapted to engage the cut face of the half fruit, means for cutting the half fruit while so held, said fruit holding means including instrumentalities permitting a relative movement between said holding means during a portion of the cutting operation, and means for preventing relative movement between said holding means during a predetermined cutting movement of the cutting means.

10. Fruit treating apparatus comprising relatively movable members for holding a half fruit, cutting means movable to cut said half fruit while so held, one of said members engaging the cut face of the half fruit and being yieldable, and means for locking said yieldable member against movement during cutting movement of the cutting means.

11. Fruit treating apparatus comprising relatively movable members for holding a half fruit therebetween, one of said members yieldably engaging the cut face of the half fruit, cutting means movable to cut the half fruit so held, and means for preventing yielding movement of the member engaging the cut face of the fruit during cutting movement of the cutting means as said cutting means moves in a direction to emerge from the body of the half fruit.

12. Fruit treating apparatus comprising relatively movable members for holding a half fruit, peeling means movable to pare the half fruit so held, means providing relative yielding movement between said members, and means preventing said relative yielding movement during cutting movement of the peeling means.

13. Fruit treating apparatus comprising relatively movable members for holding a half fruit therebetween, cutting means movable to cut the half fruit so held, means providing a relative yielding movement between said members during a portion of the movement of said cutting means, and for preventing such relative yielding movement during another portion of the cutting movement of said cutting means.

14. Fruit treating apparatus comprising means for supporting the curved portions of a half fruit, yieldable means relatively movable to said first-mentioned supporting means for contacting the flat face of the fruit, cutting means movable within the plane of the contacting means, and means for preventing the yielding of said yieldable means during a portion of the cutting movement of the cutting means.

15. In a fruit treating apparatus, the combination of opposed members for holding a half fruit therebetween, one of said members engaging the flat face of a half fruit, cutting means movable in reverse directions through said half fruit to cut the same while so held, means for yieldingly mounting the one of said holding means that engages the flat face of the half fruit, means for preventing yielding movement of said yieldingly mounted holding means during at least a portion of the movement of the cutting means.

16. In an automatic device for peeling half fruit, the combination of a substantially cup-shaped holder adapted to hold a half fruit with its cut face exposed, cooperative fruit holding means having a surface adapted to contact at least a portion of the cut face of the fruit, a peeling knife adapted to move in a predetermined path adjacent the inside wall of the cup to peel the fruit while so held, means for actuating the peeling knife, a yielding mounting for said cooperative holding means, and means for automatically locking the yielding mounting against yielding during a predetermined portion of the path of movement of the cutting means, and means for thereafter releasing the locking means upon the termination of said predetermined movement of said cutting means.

17. In a fruit treating apparatus the combination of means providing a plurality of spaced apart fruit holders each adapted to hold a half fruit with its cut face exposed, means for moving the holders, a peeling knife, means actuated in synchronism with the movement of the fruit holding means for operating said peeling knife to cause the peeling knife to peel the fruit while held in the fruit holding means, means adapted to contact the cut face of the fruit during the peeling operation to prevent tilting of the fruit during such peeling, means adapted to prevent relative movement between the fruit holding means and said contacting means during a portion of the movement of the cutting means, and means adapted to permit relative movement therebetween during another portion of the movement of the cutting means.

18. In an automatic machine for treating fruit, the combination of means providing a plurality of spaced apart substantially cup-shaped holders for holding a half fruit with its cut face exposed, cutting means adapted to move in an arcuate path through the fruit while so held, means operating in synchronized relation with the movement of the holding means for actuating the cutting means, and cooperative fruit holding means adapted to contact the fruit at its exposed face for preventing turning of the fruit during the cutting operation, means for providing a yielding movement of said contacting means during the movement of the cutting means in a direction away from the contacting means, means for holding the contacting means from yielding movement during movement of the cutting means toward said contacting means, and means for releasing said holding means, said locking means and said releasing means being operated in synchronized relation with predetermined movements of the cutting means.

19. Fruit treating apparatus comprising means for holding a half fruit, arcuate cutting means, means for causing the cutting means to enter the fruit from its cut face and to emerge from the cut face of the half fruit, fruit contacting means adapted to engage the cut face of the half fruit during the cutting thereof, means for mounting the last named holding means whereby the latter yields during a portion of the cutting movement of the cutting means, and means for holding the last named holding means from movement during another portion of the movement of the cutting means.

20. In a half fruit treating apparatus, means engaging the convex portions of a half fruit to hold it, a fruit cutting mechanism comprising means adapted to contact the flat or cut face of a half fruit on opposite sides of the center zone thereof while held by said first means, said contacting means being movable relatively to said first holding means, yielding means for urging said contacting means toward said first mentioned holding means, cutting means turning about an axis substantially within and substantially parallel with the plane of contact of said contacting means with the face of the half fruit, means for actuating the cutting means to form a continuous arcuate cut extending through the flesh of the fruit, said cut terminating at both ends at the cut face of the fruit, and means for holding the contacting means against the cut face of the fruit in the position occupied by said contacting means in respect to said first holding means under the urge of said yielding means and operating in synchronism with the movement of the cutting means.

21. Fruit treating apparatus comprising means for holding a half fruit by contacting with the convex portion of the fruit, cutting means movable in an arcuate path through the body of the half fruit, yieldably mounted means having surfaces adapted to contact the flat cut face of the half fruit for restraining the half fruit from shifting movement relative to the holding means, and means for maintaining said yieldably mounted means from yielding during at least a portion of the movement of the cutting means.

22. In an apparatus for cutting half fruit, the combination of holding means for engaging the convex surfaces of a half fruit, cutting means movable from the cut face of the fruit inwardly of the fruit, and thence outwardly of the fruit, holding means adapted to contact the cut face of the half fruit during the cutting action, means for yieldingly mounting the latter holding means during inward movement of the cutting means and for rigidly mounting the latter during outward movement of the cutting means.

23. An apparatus for cutting half fruit comprising relatively movable holding members adapted to contact the convex portions of a half fruit, means providing relative yielding between said members to receive therebetween variant sized halves of fruit, means for rigidly holding said members from relative movement after receiving the half fruit therebetween, auxiliary fruit holding members adapted to contact the cut face of the half fruit while held by said first holding members, mechanism providing relative yielding movement between said first holding members and said auxiliary holding members to receive variant sizes of half fruit therebetween, cutting means movable through the body of the fruit while held between said first and auxiliary holding members, and instrumentalities for holding said first and auxiliary holding members from relative movement during at least a portion of the cutting.

24. The combination of means for holding a half fruit including a plurality of complemental fruit holding members adapted to engage the cut face of the half fruit, means for moving said members successively into contact with the cut face of the half fruit, said members and said means permitting said members to contact the fruit in a common plane, cutting means adapted to cut into the cut face of said fruit while said fruit is held by said complemental members, and means for locking one of said fruit holding members from movement during a predetermined portion of the movement of the cutting means.

25. In combination, fruit holding means adapted to engage curved surfaces of a half fruit to hold the same, relatively movable complemental fruit holding means including a plurality of fruit contacting members adapted to contact the cut face of the half fruit, there being provision for relative yielding movement of one of said complemental holding members with respect to the cut face of the half fruit, mechanical means for relatively moving said fruit holding members to cause them to contact the fruit and hold the same therebetween, means for cutting the half fruit while so held, means for locking one of said complemental members from movement while in contact with the cut face of the half fruit during at least a portion of the movement of the cutting means, and means for relatively withdrawing one of said complemental members contacting the cut face of the half fruit from said cut face before the other complemental member is so relatively withdrawn.

26. In combination, fruit holding means for holding a half fruit therebetween including relatively movable complemental fruit holding members adapted to engage the cut face of the half fruit, mechanical means for relatively shifting said members into contact with the cut face of the half fruit in a common plane, one of said members having a fruit contacting surface of relatively smaller superficial area than the other and adapted to lie when in said common plane wholly within the marginal confines of the other, said member of larger superficial area being yieldingly mounted whereby to permit the same to yield with respect to the cut face of the half fruit, whereby to compensate for variations in thicknesses of the half fruit, means for locking said larger member while the latter is in a position to which it is yieldingly shifted, and mechanical means for relatively withdrawing said complemental members from the cut face of the half fruit including means for relatively withdrawing the member of larger superficial area from contact with the cut face of the half fruit while leaving the member of relatively smaller superficial area in contact with the fruit.

27. In a fruit treating apparatus, the combination of means for holding a half fruit along its curved surfaces, a support, means for moving the support and the first holding means relatively, means forming a yielding mounting for said support, a complemental fruit contacting member tiltably mounted on said support and adapted to contact the plane face of the fruit, and spring means disposed between said tiltably mounted member and its support.

28. The combination of means for holding a half fruit, said means embracing curved portions of the half fruit, complemental fruit holding means adapted to engage the cut face of the half fruit, means for producing relative shifting movement between the first mentioned holding means and the complemental fruit holding means whereby to embrace the half fruit therebetween, said means engaging the cut face of the half fruit and including a plurality of relatively movable members, means for normally maintaining one of said complemental members out of the plane of the other of said complemental members and including means for permitting the movement of said member into substantially the plane of the other complemental member and to there remain during the fruit cutting action, means for cutting the fruit while said complemental members engage the fruit, one of said complemental members being of greater superficial area than the other, means causing said member of greater superficial area to yield relatively to the cut face of the half fruit upon contact with the same, and means to lock said member of larger superficial area from movement relatively to the cut face of the half fruit after said larger member has so yielded.

29. In a fruit treating apparatus, the combination of a turret provided with spaced apart fruit holding members each adapted to hold a half fruit with its cut face exposed, means for mounting said turret to permit the same to turn in a substantially horizontal plane, a cutter support, a cutter mounted on said support, complemental fruit holding means mounted on said cutter support and adapted to engage the cut face of the half fruit, means for causing relative movement between the fruit holding members on the turret and said complemental fruit holding means, whereby to embrace the half fruit therebetween, means for providing a yielding contact between the complemental fruit holding means and the cut face of the half fruit, one of said complemental fruit holding means being constructed and arranged resiliently and normally to project from the other in advance of the normal plane of the other, said other complemental fruit holding means being recessed to permit said first mentioned complemental holding means resiliently to be pressed into said recess upon contact of said complemental fruit holding means with the cut face of the half fruit, and means for automatically locking the recessed complemental fruit holding means from movement relatively to the cut face of the half fruit during at least a portion of the movement of the cutting mechanism while in contact with the cut face of the half fruit, said resilient mounting for the smaller complemental fruit holding means causing it to remain in contact with the cut face of the half fruit upon preliminary relative retractive movement between the cutter support and the cut face of the half fruit.

30. In a fruit treating apparatus, a fruit holding instrumentality comprising a hollow stem, support means therefor and within which said stem reciprocates, means yieldingly urging said stem to one of the limits of its path of reciprocation, a pad on one end of said stem and having a recess therein, a second stem reciprocally disposed in said hollow stem and having a knock-out pad at an end, said knock-out pad being adapted to be seated in said recess, means yieldingly urging said knock-out pad out of said recess, and means for locking said recessed pad from yielding movement.

31. In a device of the class described, the combination of means for holding a half fruit with its cut face exposed, a cutter support, power means for producing approaching and receding movement between the holding means and the cutter support whereby to cause the cutter support and holding means to be positioned relatively adjacent each other, cutting means mounted on said cutter support and adapted in such adjacent position to contact the cut face of the half fruit, complemental fruit holding means mounted on said cutter support, means actuated solely by spring pressure for causing said complemental holding means yieldingly to contact the cut face of the half fruit on opposite sides of the center thereof whereby resiliently to position the half fruit in the first mentioned holding means for the cutting operation, and means for locking the complemental holding means relatively to the cut face of the half fruit after such positioning movement.

32. In a fruit holding and cutting machine, the combination of a support, a source of power associated with said support, fruit holding means mounted on said support and adapted to engage the curved walls of a half fruit to hold the same, a cutter head relatively shiftable with respect to said support and relatively shiftable toward and from the fruit holder, power actuated means connected with said source of power for relatively shifting said cutter head with respect to said fruit holder, whereby said fruit holder and cutter support are positioned relatively adjacent each other and relatively remote therefrom, cutting means mounted on said cutter head and adapted to be positioned adjacent the cut face of the half fruit while so held, means actuated by said source of power and connected to the cutter on said cutter head for actuating said cutter to cause the cutter to cut into the cut face of the half fruit and through the flesh of the half fruit while the half fruit is so held, complemental holding means mounted on said cutter head and resiliently shiftable with respect to said cutter head for yieldingly engaging the cut face of the half fruit during at least a portion of the cutting operation whereby to hold the half fruit from angular turning movement with respect to the first mentioned holding means, and power actuated means associated with said cutter head for locking said resiliently shiftable complemental holding means from movement during a portion of the cutting operation.

33. In a fruit holding and cutting machine, the combination of a support, a source of power associated with said support, fruit holding means mounted on said support and adapted to engage the curved walls of a half fruit to hold the same, a cutter head relatively shiftable with respect to said support and relatively shiftable toward and from the fruit holder, power actuated means connected with said source of power for relatively shifting said cutter head with respect to said fruit holder, whereby said fruit holder and cutter support are positioned relatively adjacent each other and relatively remote therefrom, cutting means mounted on said cutter head and adapted to be positioned adjacent the cut face of the half fruit while so held, means actuated by said source of power and connected to the cutter on said cutter head for actuating said cutter to cause the cutter to cut into the cut face of the half fruit and through the flesh of the half fruit while the half fruit is so held, complemental holding means mounted on said cutter head and resiliently shiftable with respect to said cutter head for yieldingly engaging the cut face of the half fruit during at least a portion of the cutting operation whereby to hold the half fruit from angular turning movement with respect to the first mentioned holding means, and power actuated cam means associated with said cutter head and including a locking mechanism automatically actuated thereby for locking said resiliently shiftable complemental holding means after the latter has moved into a yieldingly shifted position of adjustment with respect to the cut face of the half fruit.

34. In combination, a plurality of relatively shiftable fruit holding means adapted to engage the curved walls of a half fruit and to engage the cut face of the half fruit to hold the half fruit therebetween, means for producing relative shifting movement between said plurality of holding means whereby to enclose the half fruit therebetween, means for compensating for differences in the sizes of successive half fruits for determining the spaced apart position of said plurality of fruit holding means, means for locking said plurality of fruit holding means in such compensated position with the half fruit therebetween, and cutting means adapted to be shifted into position to cut into the cut face of the half fruit while held between the plurality of fruit holding means and while said half fruit is so held in locked position.

35. In combination, a plurality of relatively shiftable fruit holding means adapted to engage the curved walls of a half fruit and to engage the cut face of the half fruit to hold the half fruit therebetween, means for producing relative shifting movement between said plurality of holding means whereby to enclose the half fruit therebetween, means for compensating for differences in the sizes of successive half fruits for determining the spaced apart position of said plurality of fruit holding means, means for locking said plurality of fruit holding means in such compensated position with the half fruit therebetween, and cutting means having an axis of movement substantially parallel to the plane of the cut face of the half fruit while so held in locked position after cutting into the cut face of the half fruit.

36. The combination of means for holding a half fruit including a plurality of complemental fruit holding members adapted to engage the cut face of the half fruit, means for moving said complemental holding members successively into contact with the cut face of the half fruit, said members and said means causing said members to contact the fruit in a common plane, cutting means adapted to cut into the cut face of the half fruit, means for locking one of said complemental fruit holding members from movement during a predetermined portion of the movement of the cutting means, and means causing another of said complemental fruit holding members resiliently to engage the cut face of the half fruit while said first mentioned complemental member is so locked from movement.

37. The combination of means for holding a half fruit including a plurality of complemental fruit holding members including spring means urging each of said members yieldingly to contact the cut face of the half fruit, said members and said spring means being constructed and arranged whereby successively to be brought into contact with the cut face of the half fruit and whereby to lie in a common plane when so contacting the cut face of the half fruit, cutting means operable to cut the face of said fruit while the fruit is held by said complemental holding means, and means for locking one of said fruit holding members from movement while leaving the other member unlocked.

38. In a fruit peeling device, the combination of a fruit holder shaped to support therein the curved surface of a half fruit, support means having peeling means mounted thereon and adapted to be positioned adjacent the cut face of the fruit, means for moving the peeling means arcuately to cause it to move inwardly through the half fruit and then to move outwardly through the fruit to complete the peeling cut, auxiliary fruit holding means having a relatively flat surface shaped to conform substantially to the cross-sectional area of the cut face of the half fruit, the border line of said last-named means terminating short of that zone of the fruit carrying the peel whereby to permit free peeling movement of the peeling means while the fruit is confined between the fruit holder and the auxiliary holding means, means for positively locking the auxiliary holding means into pressing engagement with the cut face of the fruit during movement of the peeling knife in an outward direction through the flesh of the fruit, and means for releasing said positive locking means after the termination of the peeling cut.

MARK EWALD.